United States Patent [19]

Hashi et al.

[11] Patent Number: 5,206,770
[45] Date of Patent: Apr. 27, 1993

[54] APPARATUS WITH ARRANGEMENT FOR KEEPING ROTATING HEAD IN OPTIMAL CONTACT WITH MAGNETIC TAPE

[75] Inventors: Hideyuki Hashi, Kadoma; Shigeki Murata, Nara, both of Japan

[73] Assignee: Matsushita Electric Industrial Co., Ltd., Osaka, Japan

[21] Appl. No.: 911,807

[22] Filed: Jul. 10, 1992

Related U.S. Application Data

[63] Continuation of Ser. No. 436,790, Nov. 15, 1989, abandoned.

[30] Foreign Application Priority Data

Nov. 15, 1988 [JP] Japan .............................. 63-287973

[51] Int. Cl.⁵ .............................................. G11B 5/56
[52] U.S. Cl. .......................................................... 360/75
[58] Field of Search .................................... 360/75, 109

[56] References Cited

U.S. PATENT DOCUMENTS

| | | | |
|---|---|---|---|
| 4,521,815 | 6/1985 | Tokuyama | 360/75 |
| 4,581,662 | 4/1986 | Sato | 360/75 |
| 4,809,095 | 2/1989 | Ushiro | 360/75 |

Primary Examiner—Robert S. Tupper
Attorney, Agent, or Firm—Wenderoth, Lind & Ponack

[57] ABSTRACT

A rotating head apparatus includes an electromechanical conversion element which moves a magnetic head. The electromechanical conversion element allows the contact state between the tape and a rotating head to be stably optimum by varying a voltage applied to the electromechanical conversion element cyclically and according to an output from a discriminator which discriminates the kind of the tape or the rotation speed of the rotating head. Therefore, the apparatus makes it possible to keep the space loss minimum, and prevents a reduction of the performance of signal recording and reproducing.

4 Claims, 33 Drawing Sheets

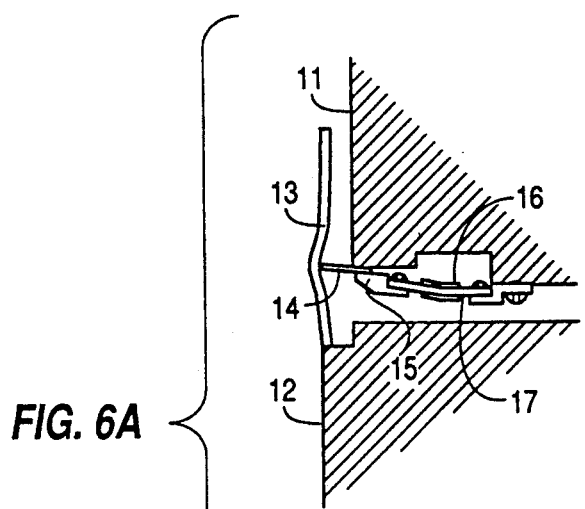
FIG. 6A
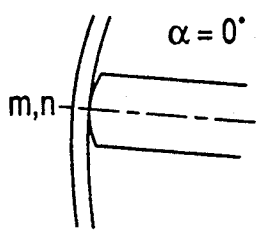
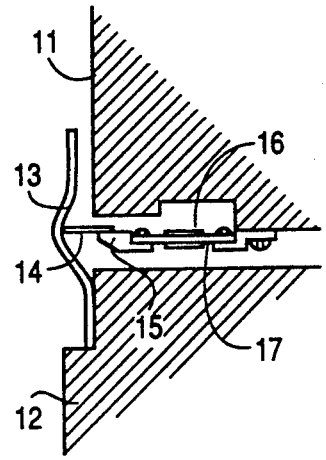
FIG. 6B
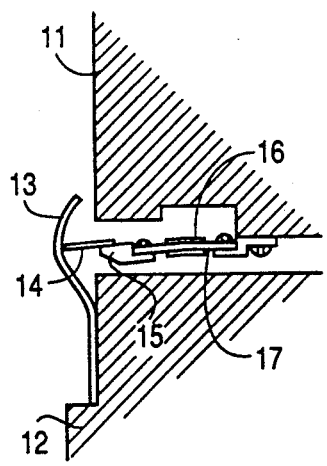
FIG. 6C
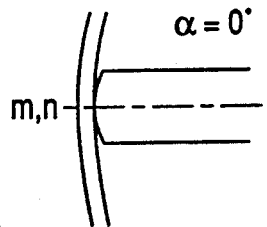
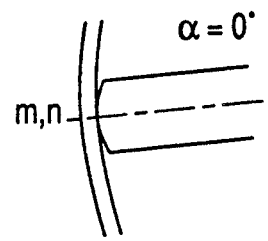

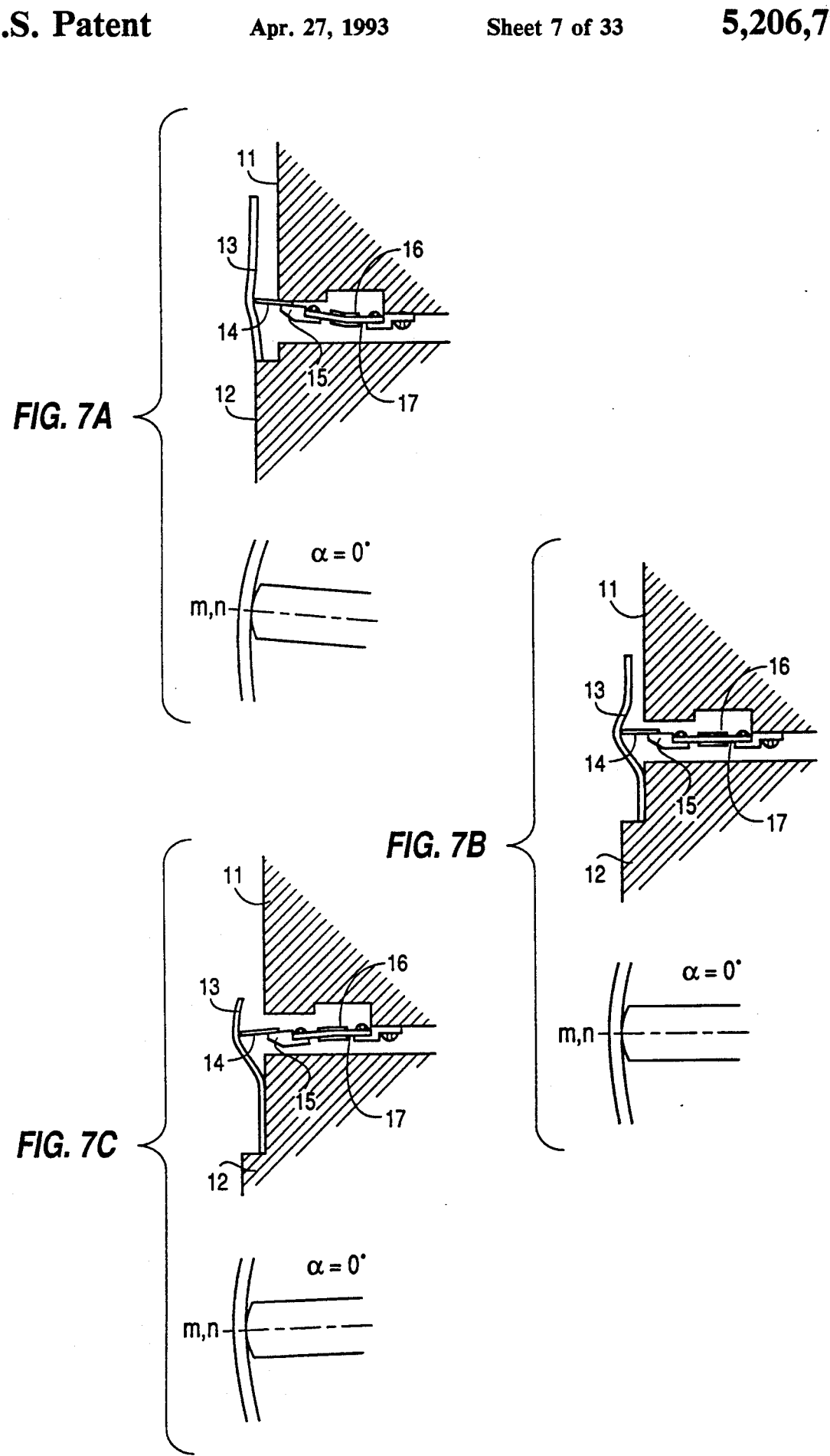

APPARATUS WITH ARRANGEMENT FOR KEEPING ROTATING HEAD IN OPTIMAL CONTACT WITH MAGNETIC TAPE

This application is a continuation of now abandoned application Ser. No. 07/436,790, filed on Nov. 15, 1989.

BACKGROUND OF THE INVENTION

1. Field of the Invention

This invention relates to a rotating head apparatus used for, in for instance, a magnetic recording apparatus.

2. Description of the Prior Art

The conventional rotating head apparatus hitherto used has a structure as shown in FIG. 23 and FIG. 24. That is, a rotary cylinder 2 which rotates at 1,000 rpm -2,000 rpm relative to a magnetic tape 1 and a stationary cylinder 3, which does not rotate, guide the magnetic tape 1. On the stationary cylinder 3, a lead 4 is provided for regulating the position of the magnetic tape 1 at the time of running. A rotating head 5 mounted on the rotary cylinder 2 is projected by several 10 microns outward from the periphery of the rotary cylinder 2. The number 6 represents a recess in which the magnetic head is disposed.

The rotary cylinder 2 rotates at 1,000-2,000 rpm and at the same time the magnetic tape 1 runs while being wound slantwise (helical) with a specified angle around the rotary cylinder 2 and the stationary cylinder 3 with a specified tape tension. The rotating head 5, which is mounted on the rotary cylinder 2 by projecting itself by several 10 microns outward from the periphery of the rotary cylinder, rotates by making contact with the tape 1.

With the conventional structure, an air film 7 is formed on the periphery of the cylinder as shown in FIG. 24. So, the contact state of the rotating head 5 with the magnetic tape 1 changes at different positions in the helical path, for example at a tape contact inlet (A), a tape contact middle position (B) and a tape contact outlet (C). Thus, as shown in FIGS. 25(A)-25(C), assuming that an angle $\alpha$ is be an angle formed in the tape width direction, perpendicular to the tape running direction, by the center line n of the magnetic gap of the rotating head and a normal line m to a tape-contacting surface of the rotating head contacting the magnetic tape, the angle $\alpha$ changes depending on the scanning position of the rotating head.

Furthermore, because the state of air film 7 varies as the cylinder rotating speed varies, there is such a problem that the angle o formed between the lines m and n varies in accordance with the variations in the cylinder rotating speed.

Experimental data is shown in FIGS. 28A to FIG. 31C on the contact state made between rotary head 5 and tape 1. The data in FIGS. 28A to FIG. 31C represent measurements of a distance between micrometer 9 and the tape 1 at the respective points of the tape contact inlet (A), middle position (B) and tape contact outlet (C), by scanning with the micrometer in a cross direction of the tape and also by changing the rigidity of the tape and the cylinder rotating speed in an experimental installation shown in FIG. 27. Experimental conditions are shown respectively as follows: in FIG. 28 cylinder rotating speed 1,800 rpm, high tape rigidity; in FIGS. 29A-29C, cylinder rotating speed is 1,800 rpm, at a low tape rigidity; in FIGS. 30A-30C, cylinder rotating speed 5,400 rpm, low tape rigidity; and in FIGS. 31A-31C, the cylinder rotating speed is 5,400 rpm, at a high speed rigidity. FIGS. 32A and 32C show experimental data, obtained through the use of an interference fringe, of the contact state between the head and the tape at the position of the tape contact inlet (A) and the tape contact outlet (C), and from these figures it becomes clear that the center of contact between the head and the tape at the tape contact inlet (A) locates higher than the head end, while at the tape contact outlet (C) the center of contact between the head and the tape locates lower than the head end. From this experimental data, it is understood that the contact state between the tape and the head varies with the variation of the cylinder rotating speed, tape rigidity, and the scanning position of the rotating head.

FIGS. 25(A)-25(C) and FIGS. 26A-25(C) show examples of contact states between the rotating head 5 and tape 1 of the conventional rotating head apparatus, in which the tape rigidity of FIGS. 26(A)-26(C) is higher than that of FIG. 25, where $\alpha$ is the angle formed between the lines m and n. As the space to the tape 1 near the magnetic gap becomes larger in accordance with the angle $\alpha$ which becomes larger, signal recording and reproducing performances reduce with larger space loss. With the conventional rotating head apparatus, the existence of larger value $\alpha$ (for example, at the tape inlet (A) and the tape outlet (C) in FIG. 24) often causes the problem of lowering the signal recording and reproducing performances. The variations in tape rigidity and thickness following the variation in the kind of the tape also cause a problem of changing the value $\alpha$ as shown in FIGS. 25(A)-25(C) and FIGS. 26(A)-26(C).

Assuming that an angle $\beta$ is an angle formed in the tape longitudinal direction, parallel to the tape running direction, by the center line n of the magnetic gap of the rotating head 5 and the normal line m to the contact surface between the tape 1 and the rotating head 5, the space to the tape 1 near the magnetic gap becomes larger as the value of $\beta$ becomes larger, so that space loss becomes larger, thereby lowering the performances of signal recording and reproducing. Such a case occur frequently such that the value of $\beta$ does not become 0 as shown in FIGS. 33A-33C and FIGS. 34A-34C. FIG. 35 shows measurements of the value $\beta$ made in accordance with the cylinder rotating speed and scanning position of the head. The value of $\beta$, like that of $\alpha$, changes in accordance with the variations of the cylinder rotating speed, tape rigidity, and scanning position of the rotating head.

To prevent the change of the angle $\alpha$ or the angle 8 dependent on the scanning position of the rotating head, such a method is known that moves the rotating head in the tape width direction or in the tape longitudinal direction according to the scanning position of the rotating head as shown in Japanese Patent Publication No. 61-144721 published on Jul. 2, 1986 and Japanese Patent Publication No. 63-4249 published on Jan. 28, 1988.

Japanese Patent Publication No. 61-144721 discloses a rotating head apparatus which has a means for detecting a rotational position of the rotating head relative to the stationary cylinder, and a means for moving the rotating head in a direction parallel to the tape running direction according to the detected rotational position of the rotating head so as to keep an optimum contact ($\beta$=0) between the rotating head and the magnetic tape at any scanning position. Japanese Patent Publication No. 63-4249 discloses a rotating head apparatus which has a means for detecting a rotational position of the rotating head relative to the stationary cylinder, and a means for moving the rotating head in a direction parallel to the tape width direction according to the detected rotational position of the rotating head so as to keep an optimum contact ($\alpha=0$) between the rotating head and the magnetic tape at any scanning position.

To move the rotating head as above, the apparatus has a circuit for generating from an output signal of the rotational position detecting means a drive voltage signal which is a cyclic saw-tooth waveform signal synchronized with the rotation of the rotating head. The rotating head is driven by the drive voltage signal to change the amount of its deviation gradually in each scanning cycle.

However, in these prior art references, no consideration is made on the change of the angle $\alpha$ or the angle $\beta$ dependent on the kind of the tape or on the rotational speed of the rotating head.

SUMMARY OF THE INVENTION

An object of this invention is to provide a rotating head apparatus for preventing signal recording or reproducing performance from lowering, by improving the contact state of a magnetic tape and a rotating head in accordance with variations in the kind of the tape and the cylinder rotating speed by keeping the value of $\alpha$ or $\beta$ almost $0°$.

In order to achieve the above object a rotating head apparatus of this invention comprises a stationary cylinder for guiding a running magnetic tape wound thereon slantwise at a specified angle, a rotating head which rotates at a specified rotating speed and has a magnetic gap for recording signals on or reproducing signals from the magnetic tape, a moving means for moving the rotating head, a discriminating means for discriminating the kind of the magnetic tape or the rotating speed of the rotating head, and a control means for controlling the moving means in accordance with an output of the discriminating means so that the magnetic gap is placed in an optimum position relative to the magnetic tape.

In a preferred embodiment, the control means includes a rotational phase detector for detecting a rotational phase of the rotating head, a saw-tooth waveform voltage signal generator for generating from an output of the rotational phase detector a periodic saw-tooth waveform voltage signal synchronized with the rotation of the rotating head, and a voltage level control circuit for controlling the peak level of the saw-tooth waveform voltage signal according to the output of the discriminating means. The moving means is driven by the saw-tooth waveform voltage signal with the controlled peak level.

This invention prevents signal recording or reproducing performance from lowering based on the above structure, by decreasing space loss with the aid of optimum control of the position to stabilize the contact state between the tape and the head.

BRIEF DESCRIPTION OF THE DRAWING

FIGS. 6A–6C are cross-sectional views showing a major part of the rotating head apparatus of the first embodiment of the present invention, in which FIG. 6A shows an enlarged view at the tape contact inlet; FIG. 6C shows an enlarged view at the middle position, and (C) shows an enlarged view at the tape contact outlet;

FIGS. 7A–7C are cross-sectional views showing the major part of the rotating head apparatus of the first embodiment of the present invention;

FIGS. 25(A)–25(C) are cross-sectional views showing a major part of the conventional rotating head apparatus, in which FIGS. 25A shows an enlarged view at the tape contact inlet; FIG. 25(B) shown an enlarged view at the middle position, and FIG. 25(C) shows an enlarged view at the tape contact outlet;

FIGS. 26(A)–26(C) are cross-sectional views showing the major part of the conventional rotating head apparatus, in which FIG. 26(A) shows an enlarged view at the tape contact outlet; FIG. 26(B) shows an enlarged view at the middle position, and FIG. 26(C) shows an enlarged view at the tape contact outlet;

FIGS. 33A-33C are cross-sectional view of a part of the conventional rotating head apparatus, in which FIG. 35A shows an enlarged view at the tape contact inlet; FIG. 33B shows an nlarged view at the middle position, and FIG. 33C shows an enlarged view at the tape contact outlet;

FIGS. 34A-34C are cross sectional views of a part of the conventional rotating head apparatus, in which FIG. 34A shows an enlarged view at the tape contact inlet; FIG. 34B shows an enlarged view at the middle position, and FIG. 34C shows an enlarged view at the tape contact outlet.

DESCRIPTION OF THE PREFERRED EMBODIMENTS

Figure 1:
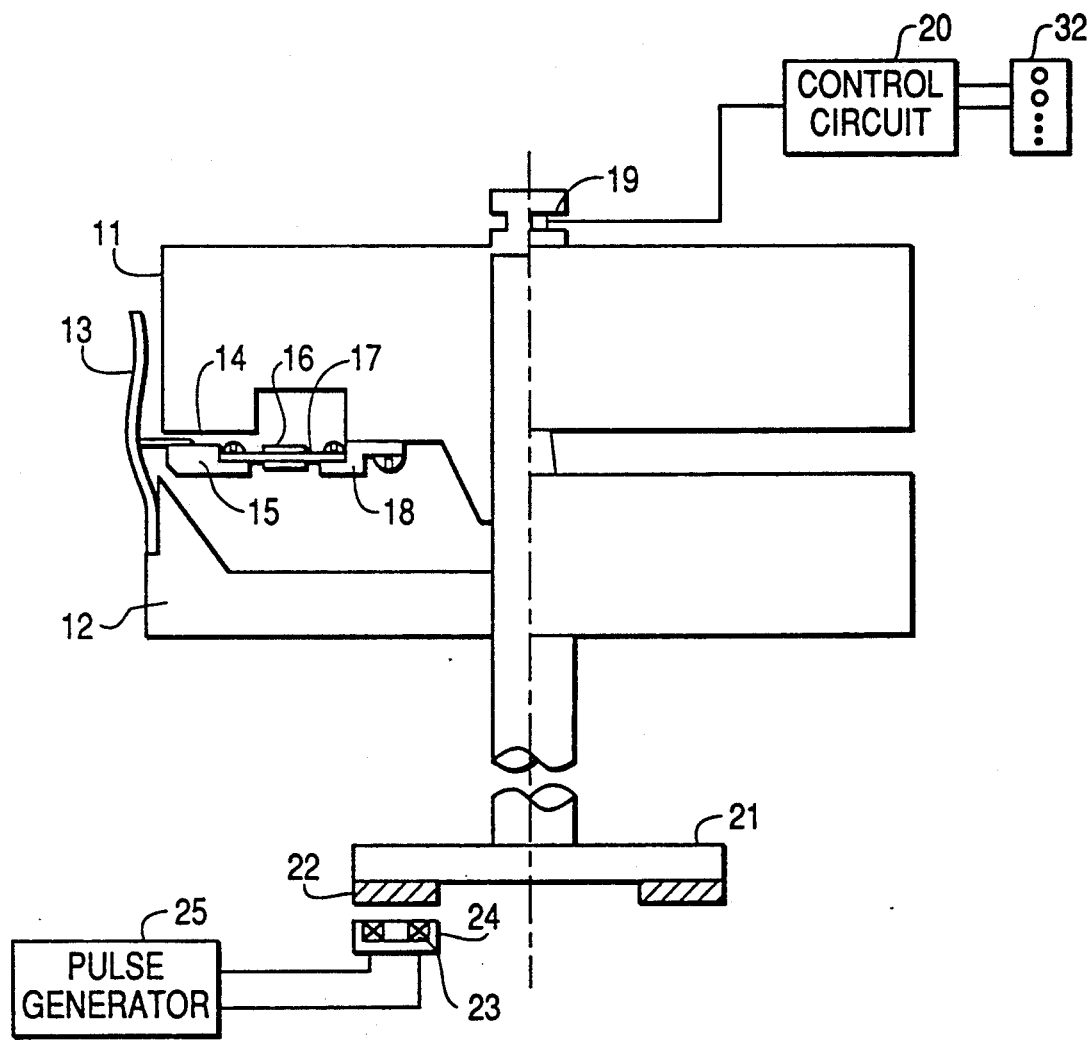
FIG. 1 is a cross-sectional view showing a major part of a rotating head apparatus of a first embodiment of the prevent invention.
Figure 2:
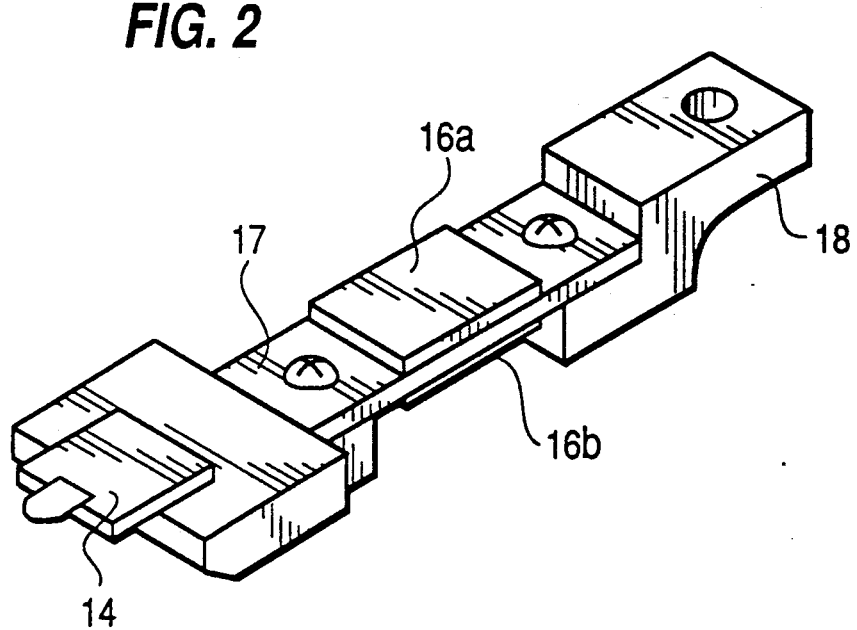
FIG. 2 is a perspective view showing a part of the rotating head apparatus of the first embodiment of the present invention.
Figure 5A:
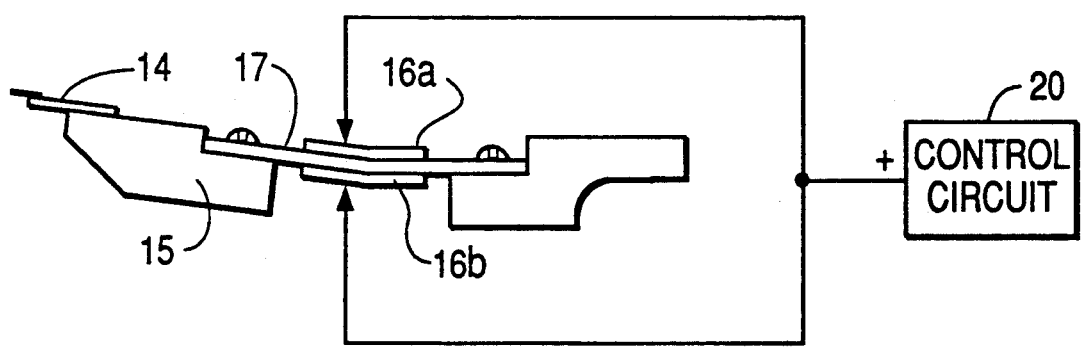
FIGS. 5A–5C are diagrams for explaining an operation of the first embodiment of the present invention.
Figure 5B:
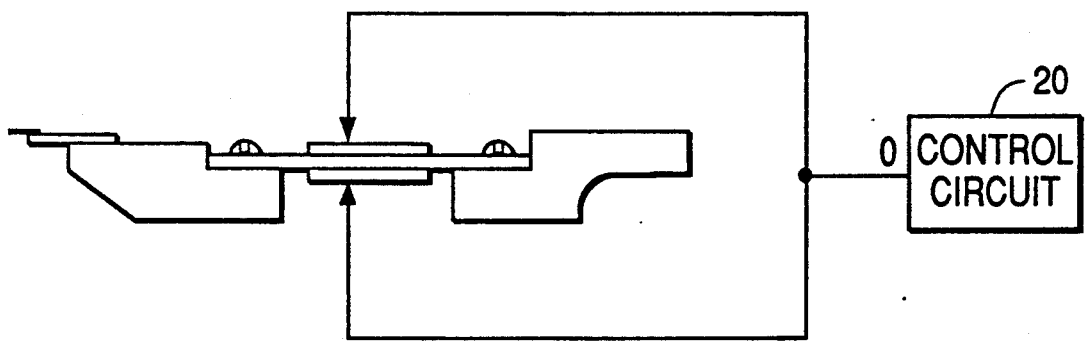
Figure 5C:
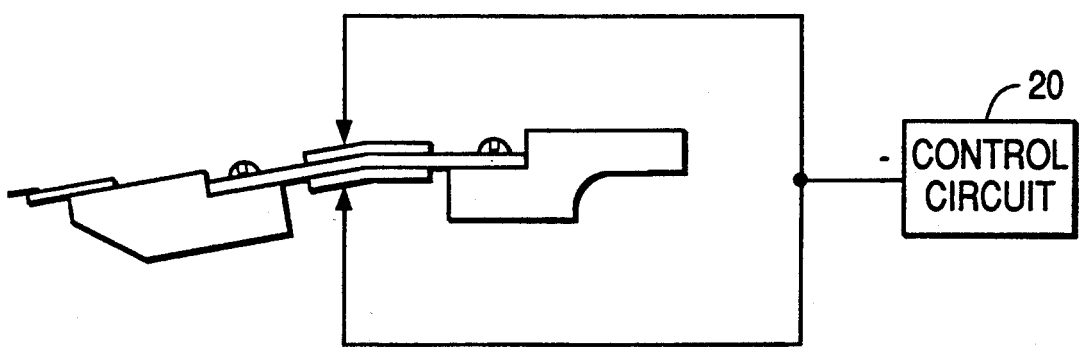

FIG. 1 shows a structure of a rotating head apparatus of a first embodiment of the present invention. In this embodiment, a rotating head is moved in a direction perpendicular to the tape running direction to keep in optimum contact with a tape according to the kind of the tape. In FIG. 1, a rotating head 14 attached to a head mounting table 15 which is made of an insulating material is fixed to a rotary cylinder 11 via electromechanical conversion elements 16 and 17, and a frame 18. The head 14 may be one of a pair of rotating heads which are 180° apart from each other, for example. A slip ring 19 as a known means transmits a signal from a control circuit 20 to the electromechanical conversion elements 16 and 17. The electromechanical conversion elements 16 and 17 are displaced by an electrical signal. The details of the electromechanical conversion elements 16 and 17 are shown in FIG. 2. In FIG. 2, a thin phosphor bronze plate 17 is supported by a frame 18, and provided on opposite major surfaces thereof with piezoelectric ceramics 16a and 16b at the middle part. The plate 17 allows an electrical voltage to be supplied to the piezoelectric ceramics 16a and 16b. A flexible material like the phosphor bronze plate 17 shows such a behavior as bending like a bow when a voltage is supplied to the piezoelectric ceramics 16a and 16b. The bending direction is determined by the characteristics of the piezoelectric ceramics and the polarity of the voltage to be applied. Such a structure is widely known as the piezobimorph. Therefore, supplying a voltage will bend the electromechanical conversion elements 16 and 17 upward as shown in FIG. 5(A). On the contrary, reversing the polarity of the voltage to be applied to each piezoelectric ceramic will bend the elements downward as shown in FIG. 5(C). When no voltage is applied, they become parallel with the frame 18 as shown in FIG. 5(B). In this way, the rotating head moves pivotally to keep optimum contact with the tape.

Figure 25A:
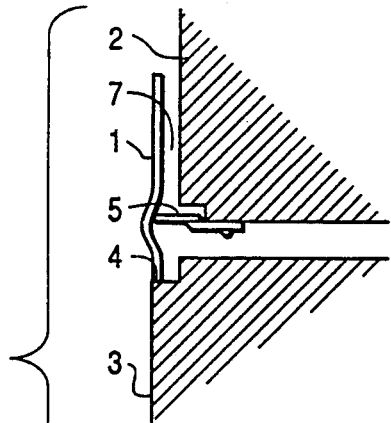
Figure 25B:
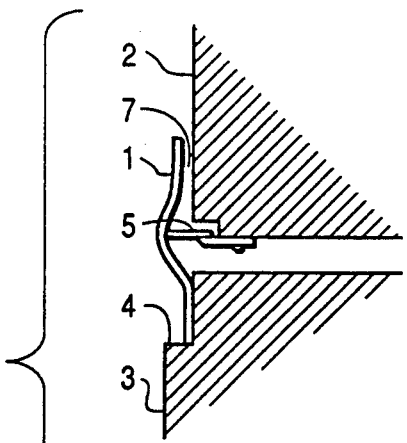
Figure 25C:
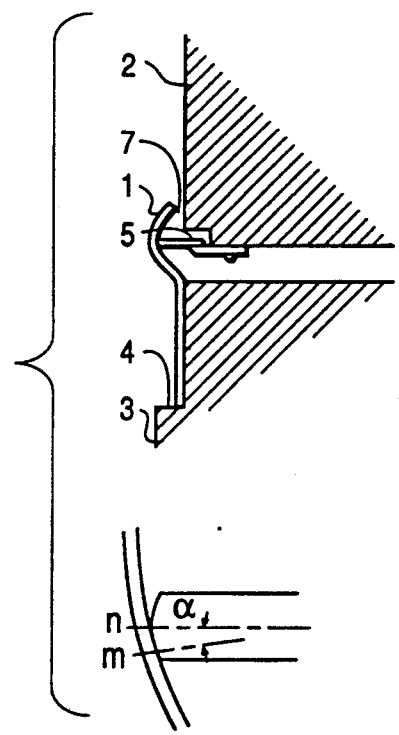
Figure 26A:
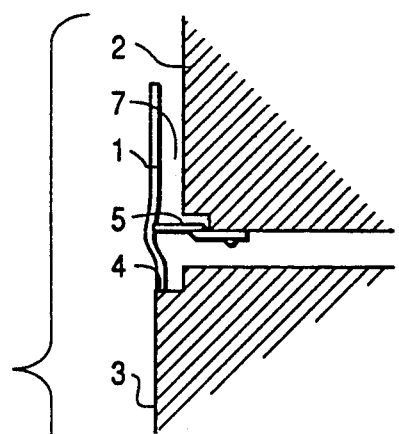
Figure 26B:
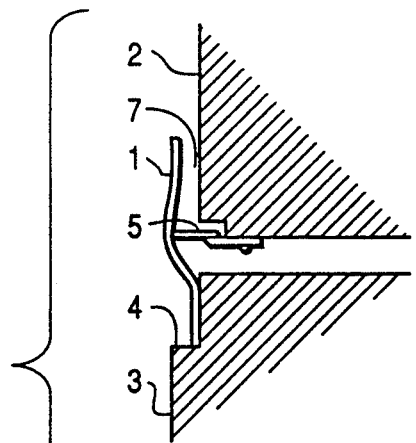
Figure 26C:
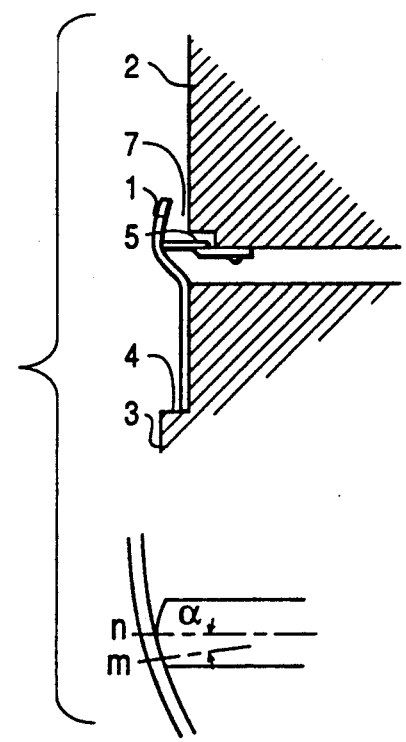
Figure 27:
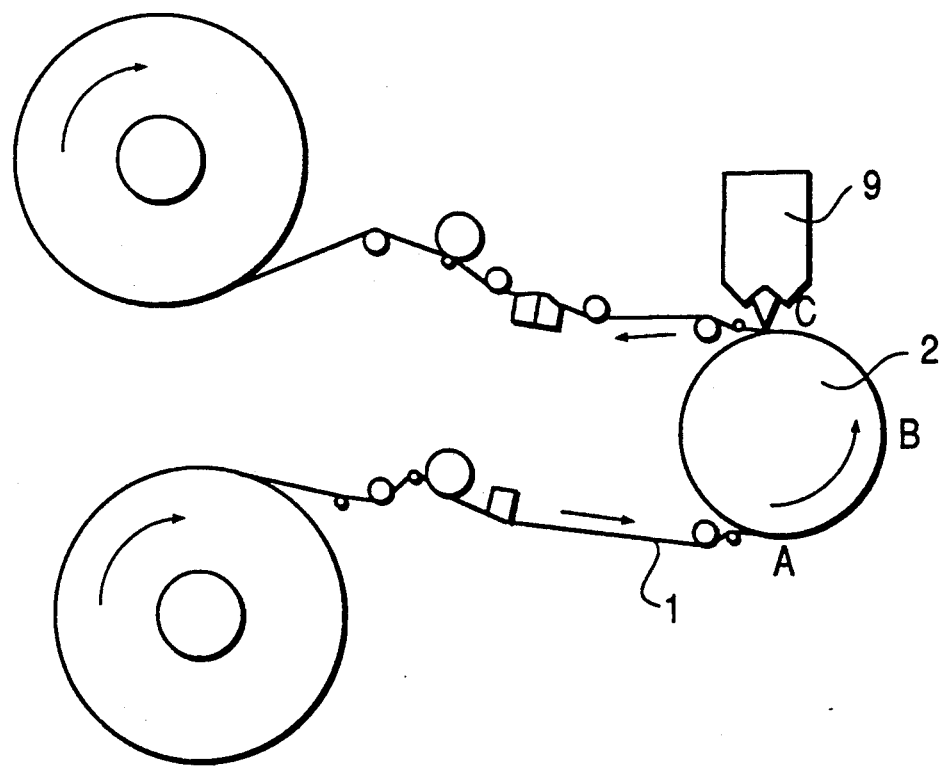
FIG. 27 is a schematic diagram showing an experimental apparatus.
Figure 28A:
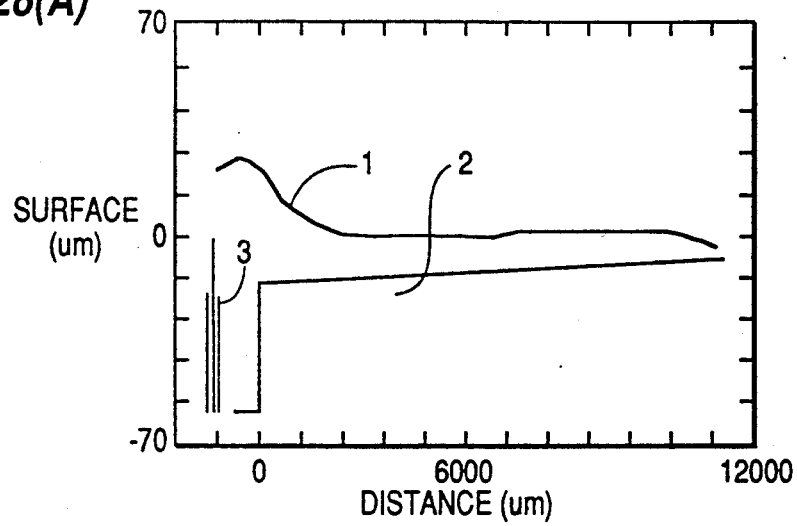
FIGS. 28A through FIG. 31C show experimental data.
Figure 28B:
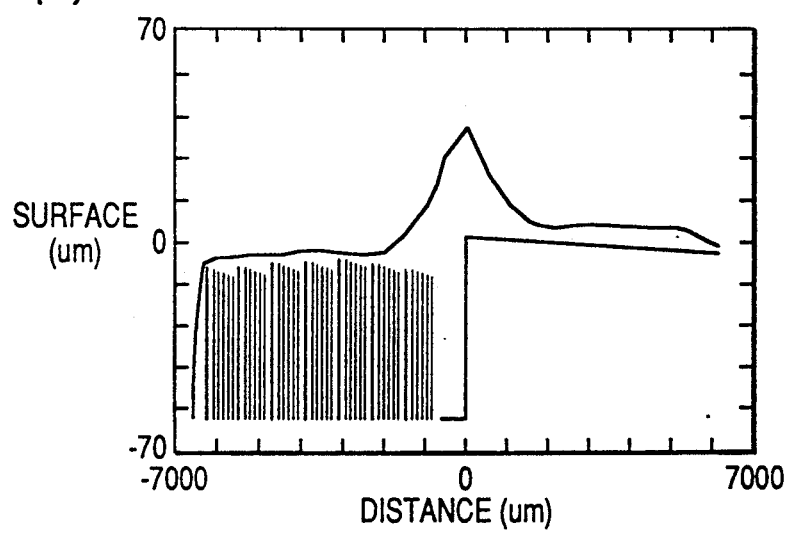
Figure 28C:
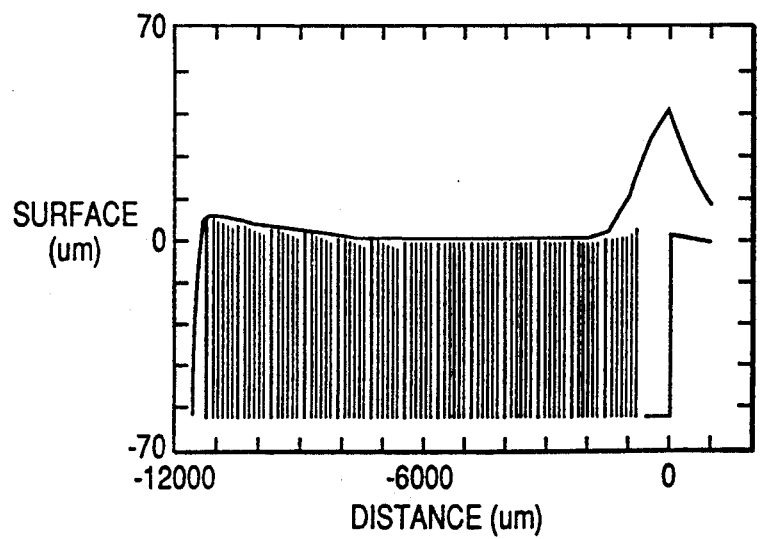
Figure 29A:
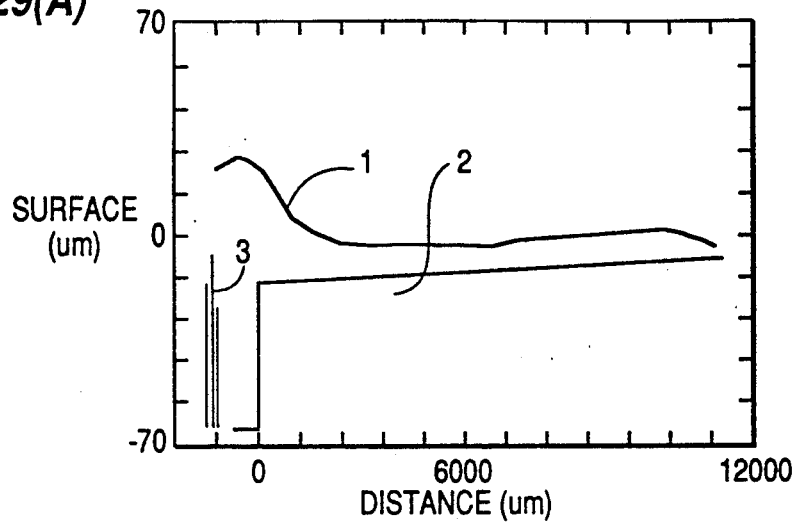
Figure 29B:
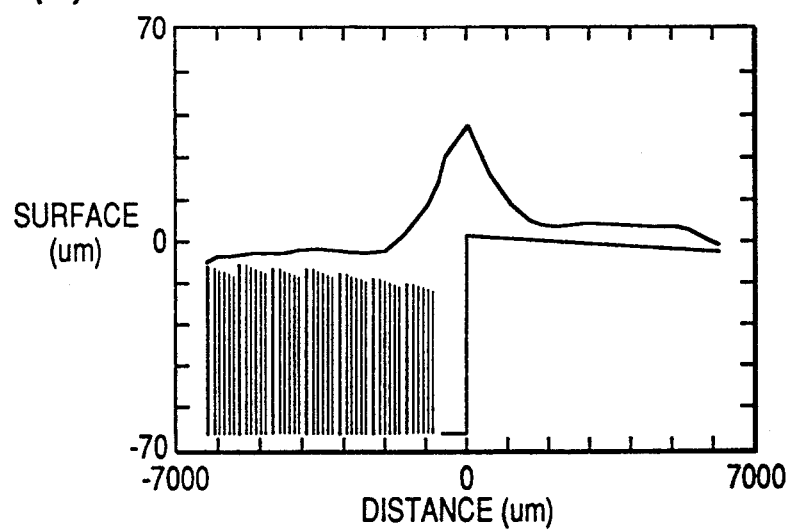
Figure 29C:
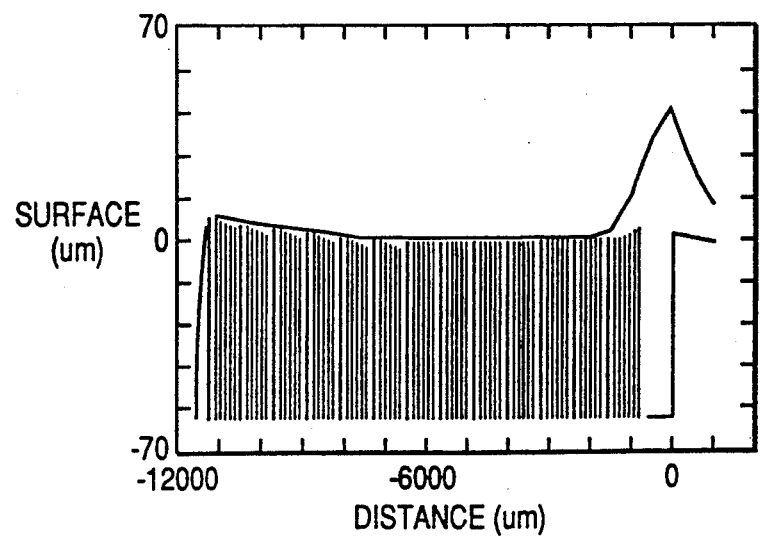
Figure 30A:
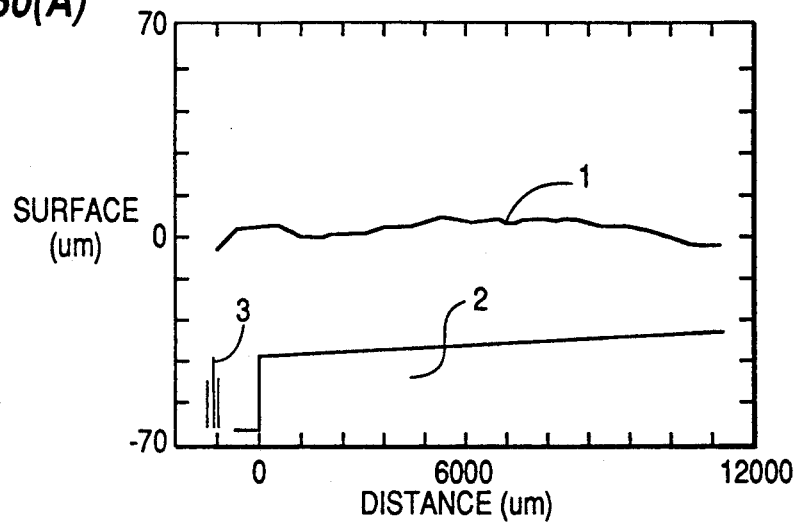
Figure 30B:
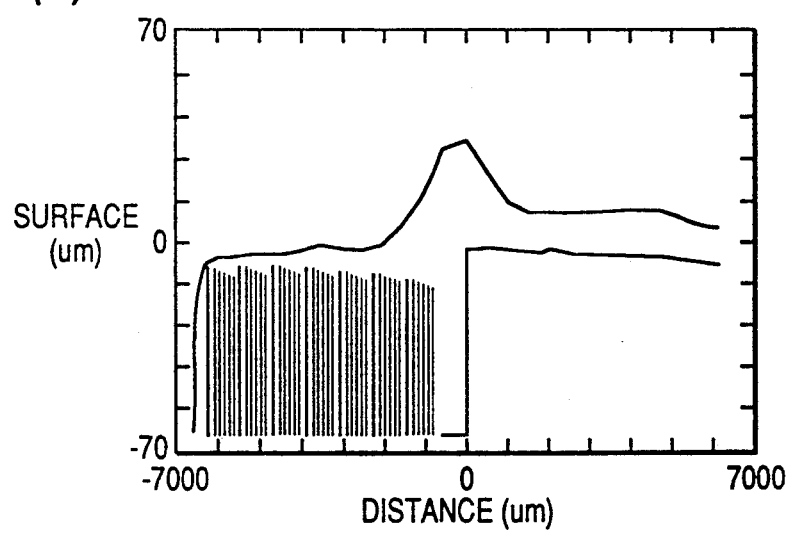
Figure 30C:
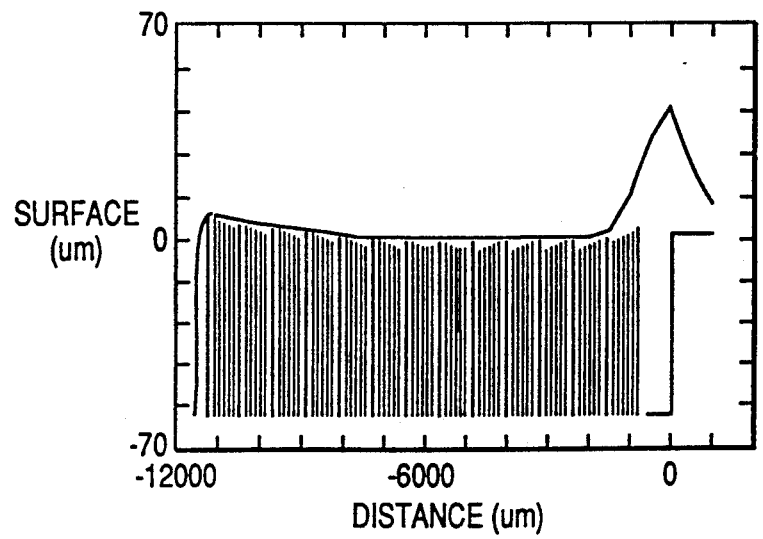
Figure 31A:
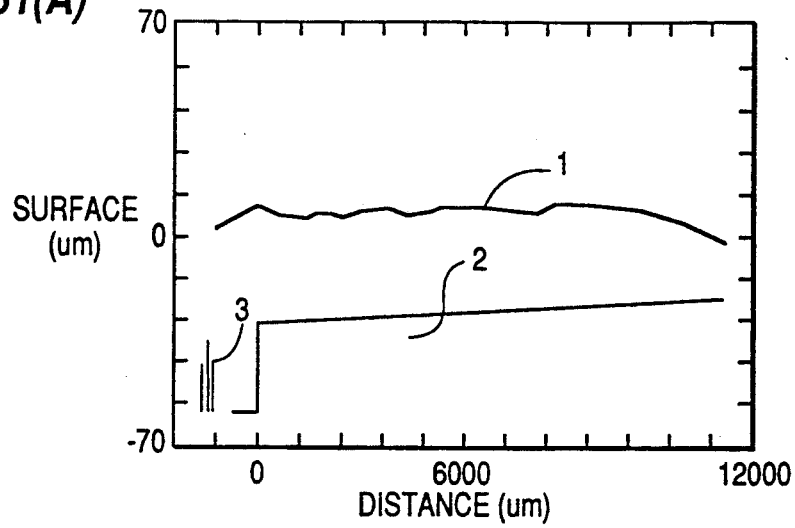
Figure 31B:
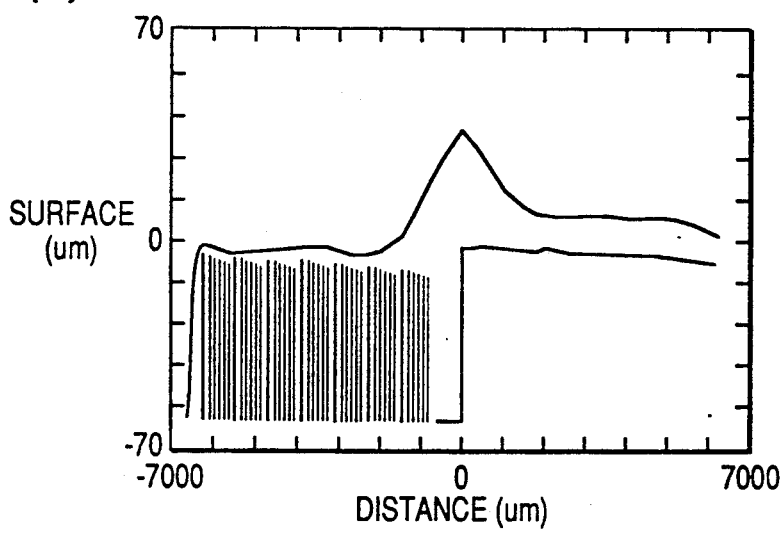
Figure 31C:
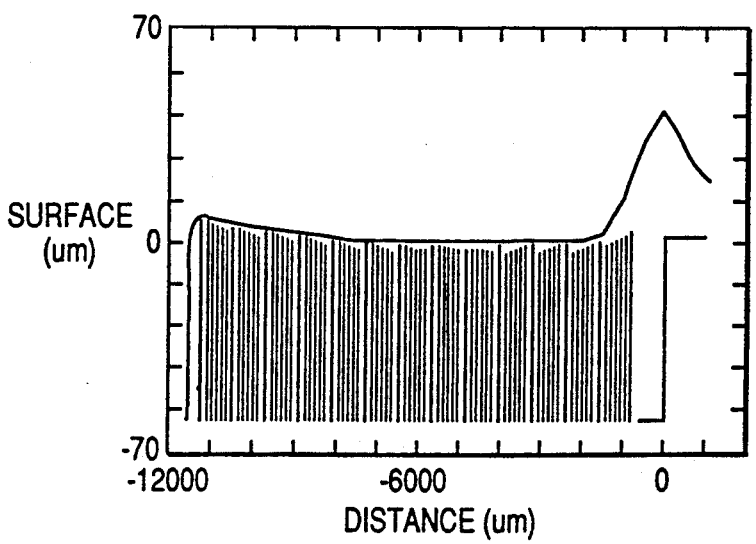
Figure 32A:
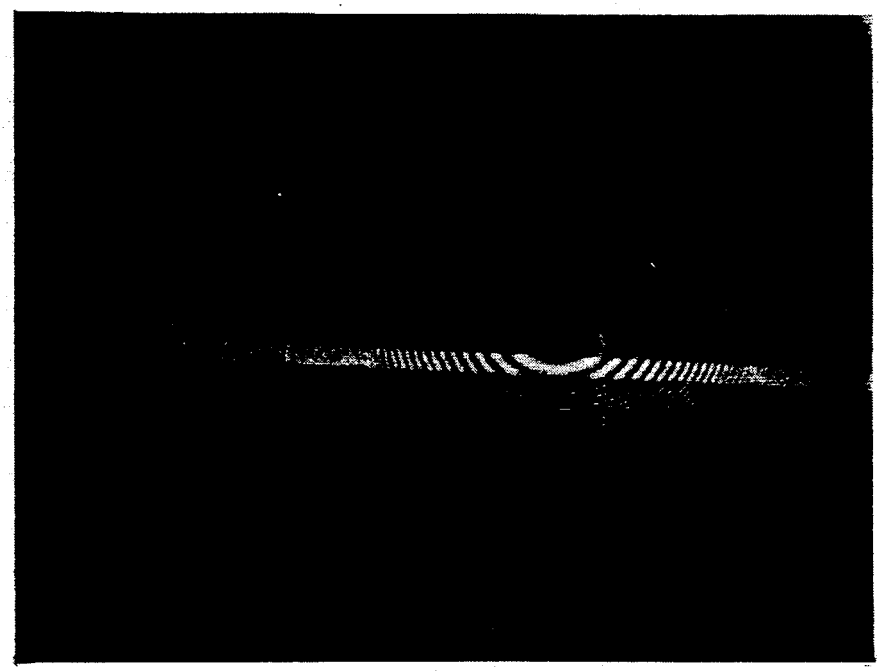
FIGS. 32A and 32C show is experimental data in which contact state between the head and the tape is seen at the positions of the tape contact inlet (FIG. 32A) and the tape contact outlet (FIG. 32C) by utilizing interference fringes.
Figure 32C:
Figure 33A:
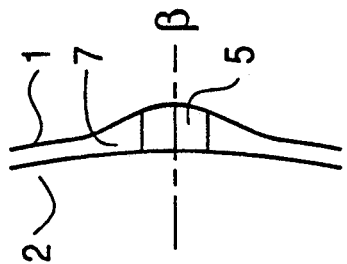
Figure 33B:
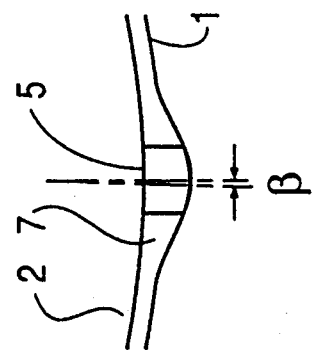
Figure 33C:
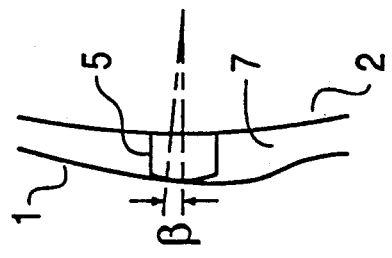
Figure 34C:
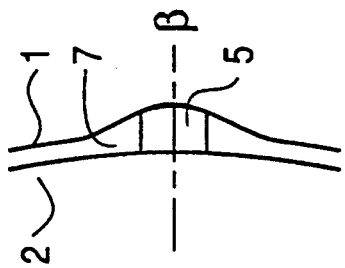
Figure 34B:
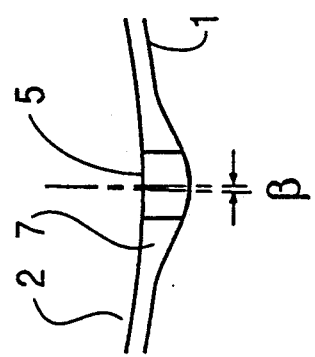
Figure 34A:
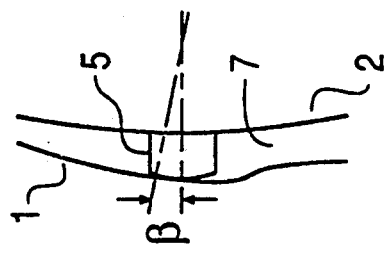

Keeping always the value of $\alpha$ zero will allow a stable signal transmission between the rotating head 14 and the tape 13, by changing a head support in accordance with the contact state between the rotating head 14 and the tape 13 as shown in FIG. 5A-5C against the variation of normal line m to the contact plane of the tape 13 and the rotating head 14, as shown in FIGS. 25(A) through 25(C) (if the rigidity of the tape is low) or in FIGS. 26(A) through 26(C) (if the rigidity of the tape is high).

Namely, in the position (angle of rotation $\theta=0°$) at the tape contact inlet (A) in FIG. 6A, because the angle $\alpha$ formed between the normal line m to the contact surface of the rotating head 14 with the tape 13, and the center line of the magnetic gap of the rotating head 14 is larger, the value of o is made nearly 0° by applying a control voltage as shown in FIG. 5(A) from the control circuit 20.

Following this, while the rotating head 14 moves from the position of the tape contact inlet (A) (angle of rotation $\theta=0°$), the control voltage from the control circuit 20 is set so that the angle $\alpha$ will always become nearly 0°. Therefore, at the middle position (B), the position of the tip of the rotating head 14 (magnetic gap) comes to the position as shown in FIG. 6(B). Even while the position comes from the middle position (B) (angle of rotation $\theta=90°$) to the position (angle of rotation $\theta=180°$) of the tape contact outlet (C), the control voltage from the control circuit 20 is set so that the angle $\alpha$ will always come to nearly 0°.

Therefore, at the position of the tape contact outlet (C), the position of the tip (magnetic gap) of the rotating head 14 will come to the position as shown in FIG. 6(C). By setting the control voltage so that the angle $\alpha$ rotating head 14 becomes always 0° as shown in FIGS. 6(A), 6(B), and 6(C), the simple structure as shown above allows the contact state with the tape 13 near the magnetic gap of the rotating head 14 to be optimum, thus making it possible to keep the space loss at a minimum.

However, when the kind of the tape is changed as shown in FIGS. 25(A)-25(C) and FIGS. 26(A)-26(C) of the conventional example for example, the contact state (the value of $\alpha$) between the tape and the head also changes. Therefore, by setting a selecting switch 32 (See FIG. 1) to select the corresponding kind of the tape, the control circuit 20 sets the control voltage so that the value $\alpha$ is set to 0° in accordance with an output of the selecting switch 32.

First of all, selecting the kind of the tape with the selection switch 32 will cause the control circuit 20 to generate an output voltage according to the selected kind of tape and drive the electromechanical conversion elements 16 and 17 through the slip ring 19, and will then allow the locus of movement of the rotating head 14 to be changed in accordance with the selected kind of tape. FIGS. 7A-7C show a contact state between the head 14 and tape 13 in case the rigidity of the tape is higher than that of the tape in FIGS. 6A-6C. Although the operation in FIGS. 7A-7C show is the same as in FIG. 6, the value of $\alpha$ is smaller than that of FIGS. 6A-6C because the rigidity of the tape is higher than that of FIGS. 6A-6C (see FIGS. 25(A)-25(C) and 26(A)-26(C)). Therefore, a smaller amount of deviation of the head than the case of FIGS. 6A-6C is caused by lowering the value of the control voltage.

Then, detailed explanation will follow for the control circuit 20 and the selecting switch 32 in FIG. 1.

Figure 3:
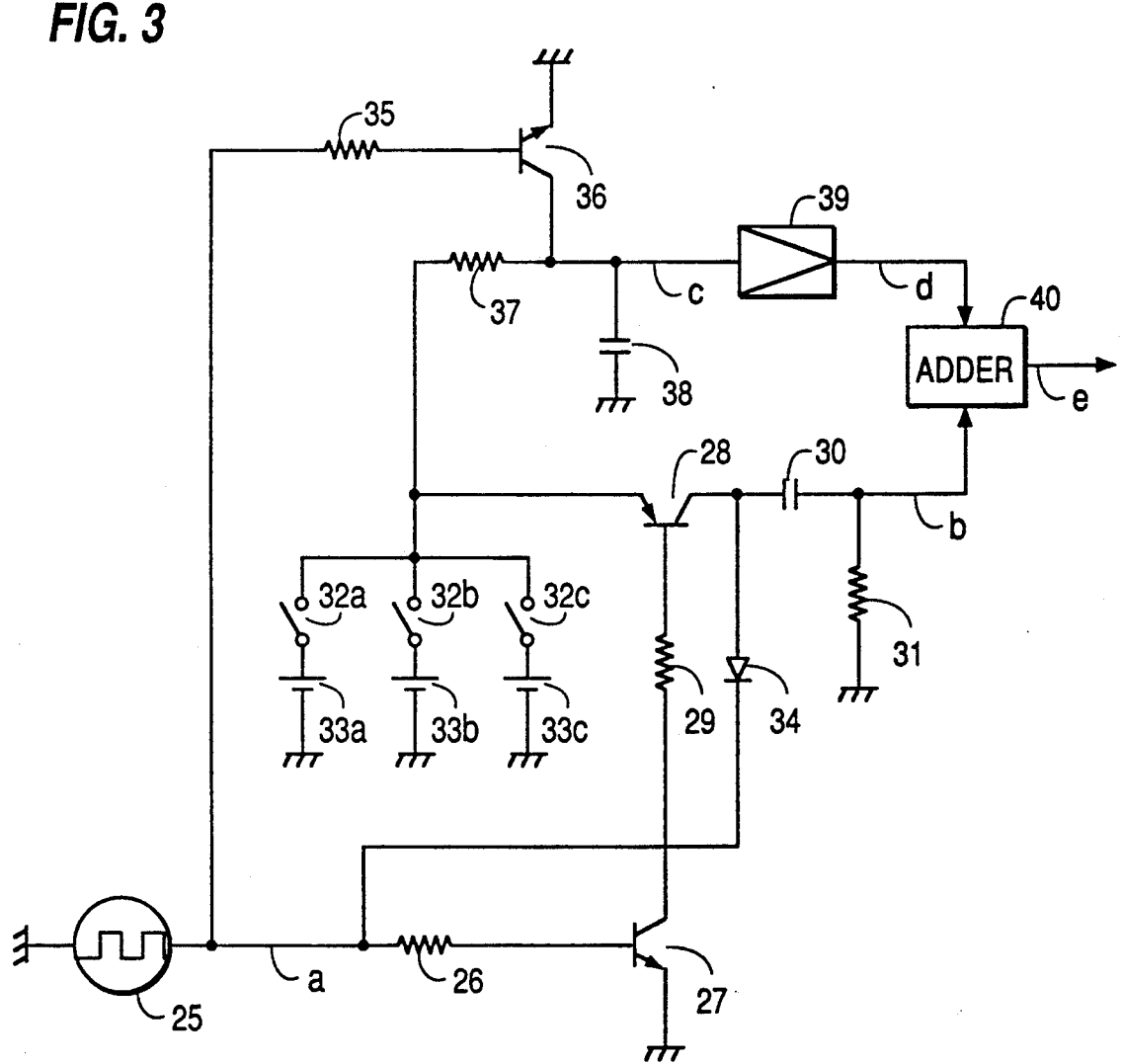
FIG. 3 is a circuit diagram showing a control circuit of the first embodiment of the present invention.

FIG. 3 shows a circuit diagram of the circuit 20 and switch 32 for generating a voltage applied to the piezoelectric ceramic 16. Explanation on the circuit operation of FIG. 3 follows below using FIGS. 4a–4f.

Figure 4:
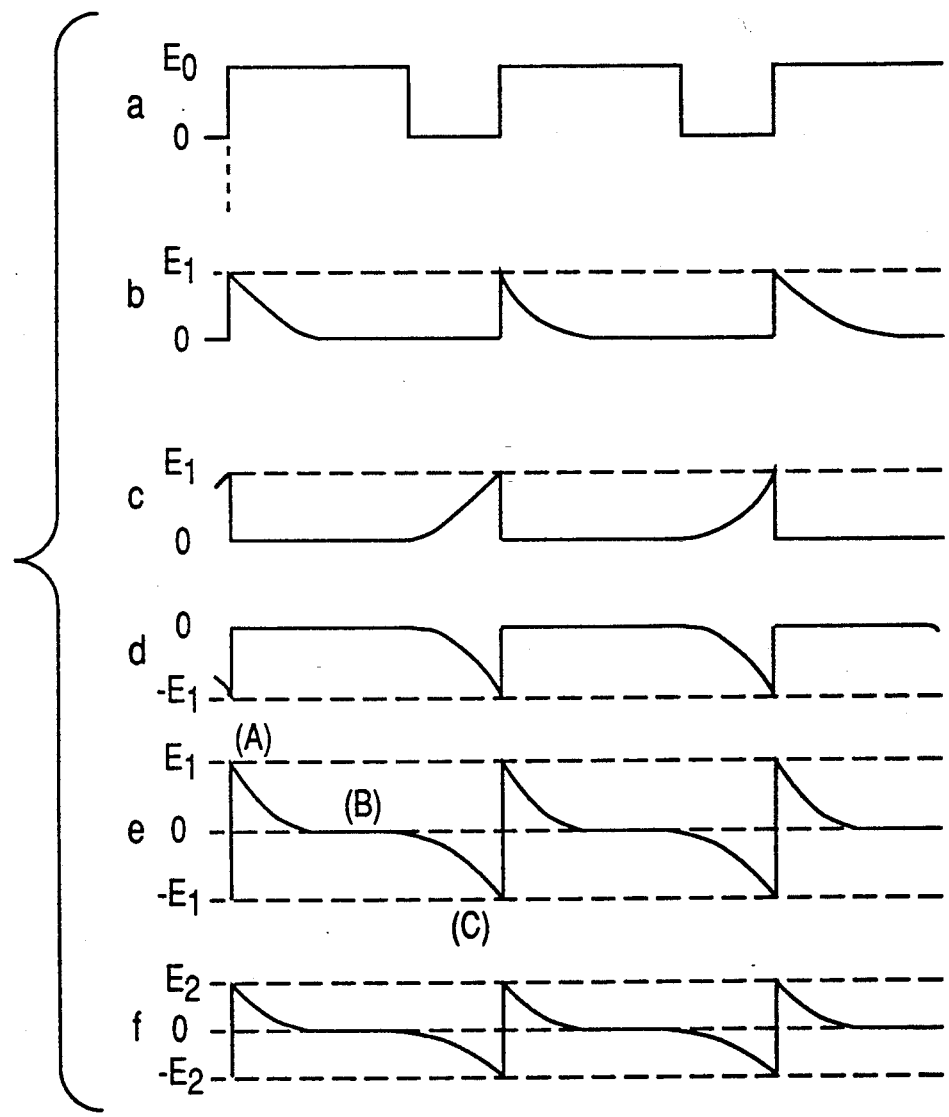
FIGS. 4a–4f signal waveform diagrams for explaining an operation of a driving circuit of the first embodiment of the present invention.

The operation reference signal of the circuit shown in FIG. 3 is generated by detecting the rotary phase of the rotating head 14 by a pulse generator 25. This is carried out by arranging two magnets 22 on the lower surface of the rotary plate 21 which rotates in one body with the rotating head 21 and a coil 23 and a yoke 24 opposing the magnets 22 as shown in FIG. 1. Namely, the relationship of the arrangement among the rotating head 14, magnet 22 and yoke 24, and coil 23 is made workable so that magnet 22 and yoke 23, and coil 23 will come closer each other when the rotating head 14 plunges into the tape 13. Then, when the rotating head 14 plunges into the tape 13, the magnet 22 passes near the coil 2 and then an instantaneous current is generated on the coil 23, thus a trigger is generated by the pulse generator 25. Assuming that the rotating head 14 is rotating at 30 revolutions per second, a trigger with a period of 1/60 second is generated, so that a pulse with a period of 1/60 second as shown in FIG. 4(a) is generated by the pulse generator 25. Therefore, the time at which this pulse (reference) signal is built up and the time at which the rotating head 14 plunges into the tape end approaches to the same time.

When the reference signal approaches to a high voltage, transistors 27 and 28 are closed via a resistor 26, so that a differential waveform as shown in FIG. 4(b) is generated by a capacitor 30 and a resistor 31 at point b. The peak value of this differential waveform is the value determined by a power source 33 (33a–33c). That is, with the selection switch 32 (32a–32c), turning a selecting button 32a to ON will make the peak value $E_1$ of the power source 33a, turning a selecting button 32b to ON will make the peak value $E_2$ of the power source 33b, and turning a selecting switch 32c to ON will make the peak value $E_3$ of the power source 33c. Thereafter, an explanation will follow of the selecting switch 32a turned to ON. In this case the peak value comes to $E_1$.

When the reference signal comes to a low voltage, the transistors 27 and 28 become open, so that the electrical charge of the capacitor 30 is discharged through a diode 34. Also, the reference signal controls a transistor 36 via a resistor 35. Because the transistor is closed when the reference signal is at the high voltage, the charge on a capacitor 38 is almost zero. However, when the reference signal is at the low voltage, the transistor 36 opens and the charge of the capacitor 38 will rise at the rate of a time constant to be determined by a resistor 37 and the capacitor 38. That is, at the point C in FIG. 3 a voltage waveform as shown in FIG. 4(C) is generated in accordance with the reference signal. Therefore, the waveform in FIG. 4(C) is converted into a waveform as shown in FIG. 4(d) by an inverting amplifier 39. Furthermore, since adding a signal in FIG. 4b and a signal in FIG. 4d by an adder 40 provides a periodic saw-tooth waveform voltage signal as shown in FIG. 4e, applying this signal to the piezoelectric ceramic 16 will allow the rotating head 14 to be at a state as shown in FIG. 5(A) and FIG. 25(A), while to be at a state as shown in FIG. 5(B) and FIG. 25(B), and to be at a state as shown in FIG. 5(C) and FIG. 25(C). In addition, because a selecting switch 32 in FIG. 1 allows the peak value as shown in FIG. 4e to be altered, movement of the head can be changed according to the kind of tape. In case the rigidity of the tape is higher (see FIGS. 26A–26C), the value of α is smaller, so that it is necessary to make the movement of the head smaller. Then assuming $E_1 > E_2$, the peak value is made $E_2$ by turning ON the selecting button 32b, thereby leading the signal to be supplied to the piezoelectric ceramic 16 to the one as shown in FIG. 4f. Therefore, the movement of the head becomes smaller than the state where the selecting button 32a is turned ON, thereby making it possible to always make the value of α nearly 0.

As mentioned above, according to the present embodiment, a simple structure allows the contact state between the tape and the rotating head to be improved depending upon the kind of the tape, and can provide a rotating head apparatus which prevents the performance of signal recording and reproduction from lowering.

Figure 8:
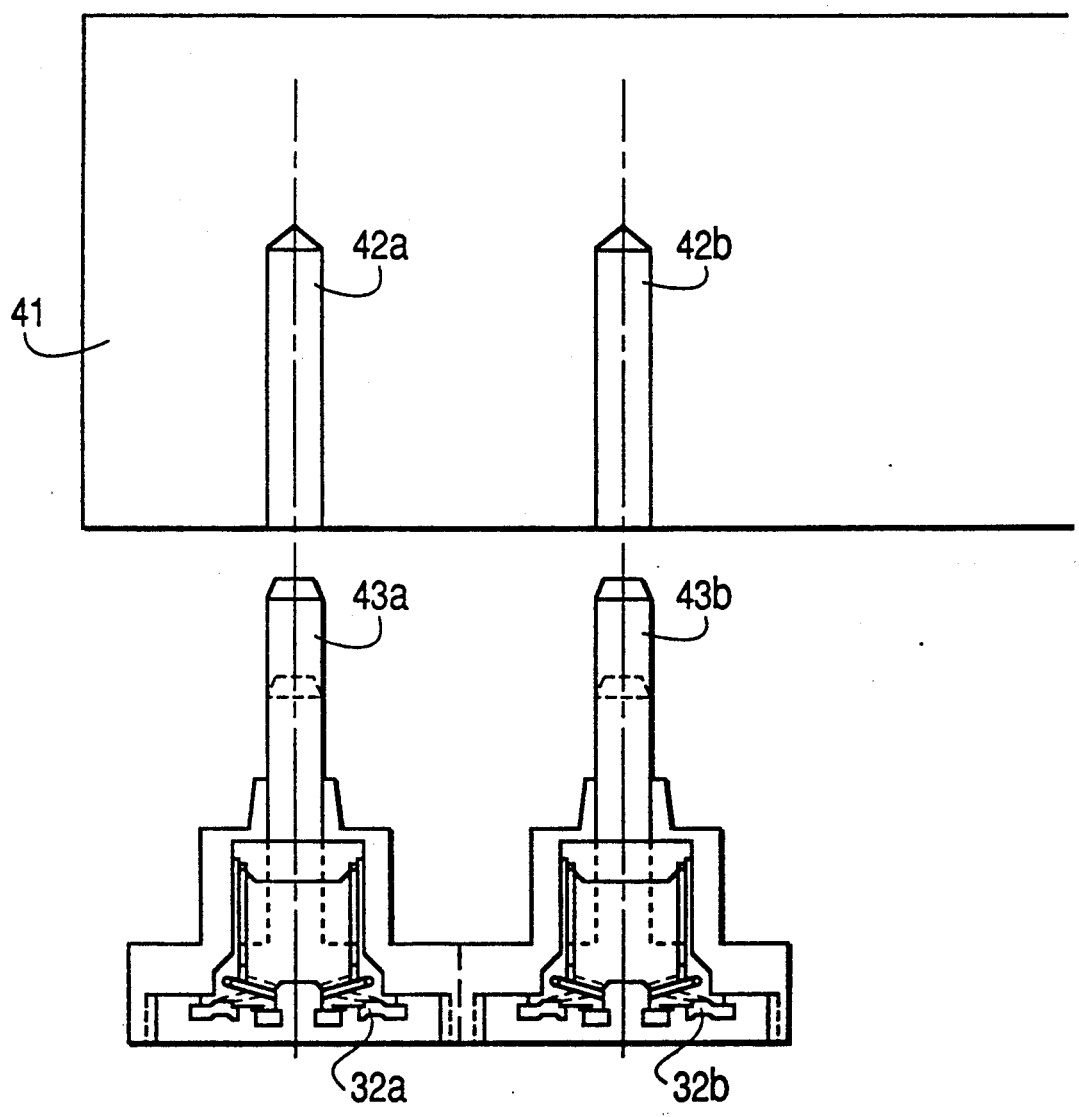
FIG. 8 shows one example of a detecting means of the first embodiment of the present invention.

In the present embodiment, selecting buttons are employed as the selecting switch, it is not confined within the present embodiment only and the same effect is obtainable by turning switches 32a and 32b ON/OFF by use of cassette detection holes 42a and 42b of a cassette 41 as shown in FIG. 8. In FIG. 8, in order to set the switch 32a ON for instance, the cassette detection hole 42a may be closed and the cassette detection hole 42b may be opened. Pins 43a and 43b are to be inserted to the holes 42a and 42b, respectively.

In the present embodiment, although the viewpoint is focused only on the rigidity of the kind of the tape, it is not limited to this embodiment and is possible to control deviation of the head with provisions like the selecting switch by focussing the viewpoint on other factors like tape thickness, etc.

Figure 9:
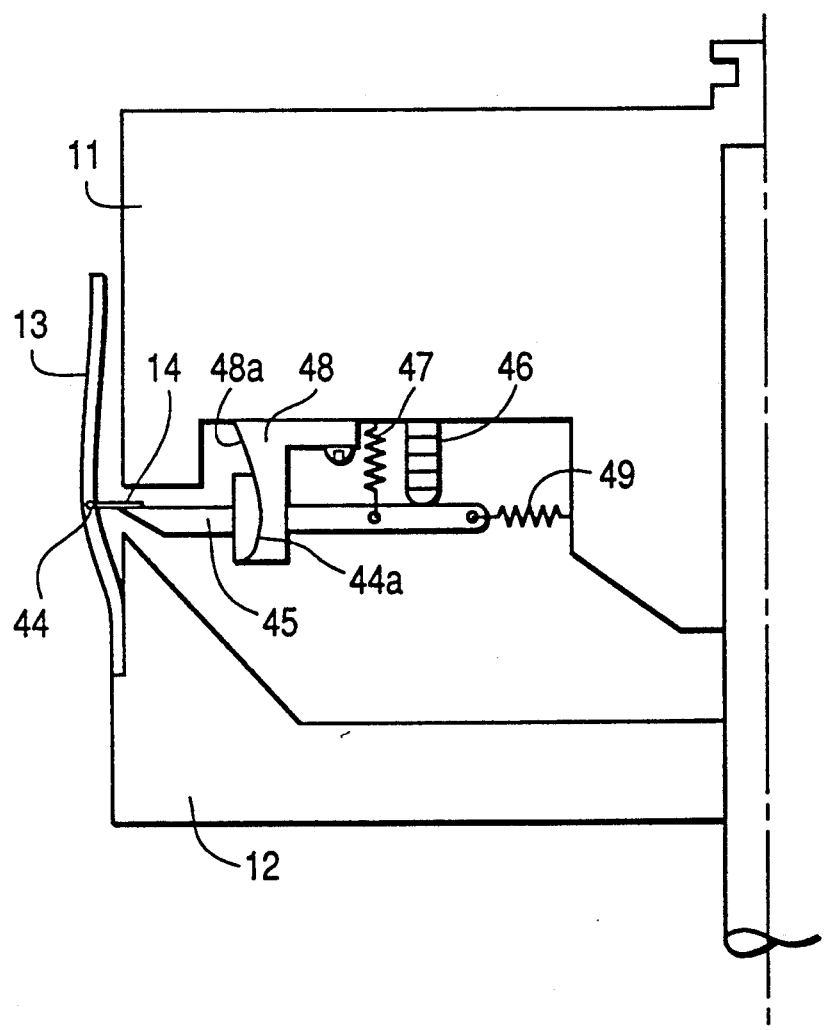
FIG. 9 is a cross-sectional view showing a major part of a rotating head apparatus of a second embodiment of the present invention.

Furthermore, means for moving the rotating head may be constructed as shown in FIG. 9, not only limiting the method as shown above. In FIG. 9, 45 is a lever, 48 is a guide member, the shape of each of parts 45a and 48a is an arc whose center is positioned at the tip of the magnetic gap of a rotating head 14. The lever 45 is tensioned with a tension spring 47 so that it is always in contact with a piezoelectric ceramic 46 and is furthermore tensioned with a tension spring 49 so that the part 45a is in contact with the part 48a. Therefore, the lever 45 turns by expansion of the piezoelectric ceramic 46 with its fulcrum on the center of curvature in a direction of thickness near the magnetic gap on the rotating head 14. The method of applying a voltage to the piezoelectric ceramic 46 may be done in accordance with the kind of the tape as shown in FIG. 4e and 4f by the method described before. According to the embodiment in FIG. 9, there is such an advantage that the scanning locus of the rotating head against the tape 13 becomes straight because the tip of the rotating head does not move.

Figure 10:
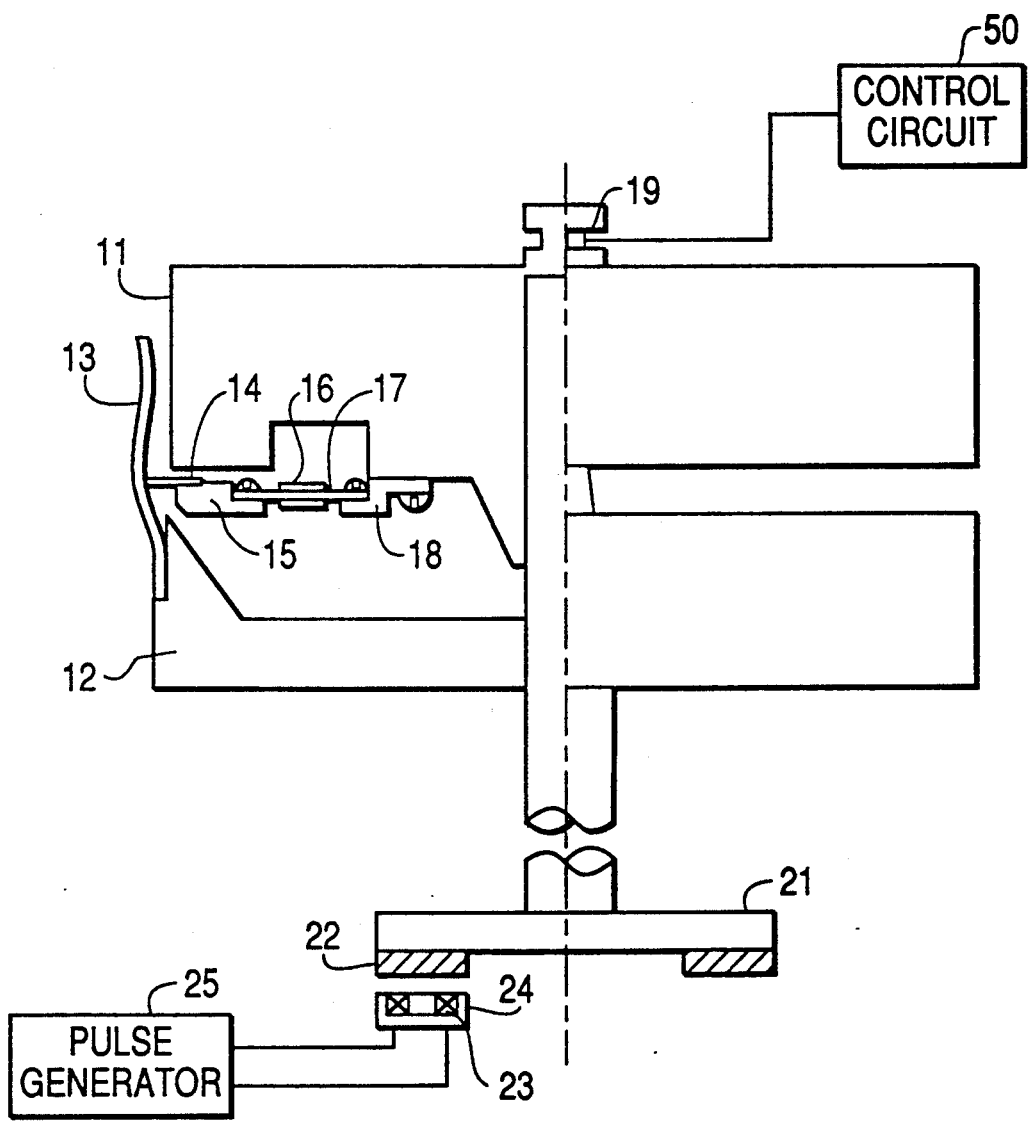
FIG. 10 is a cross-section view showing a major part of a rotating head apparatus of a third embodiment of the present invention.
Figure 11:
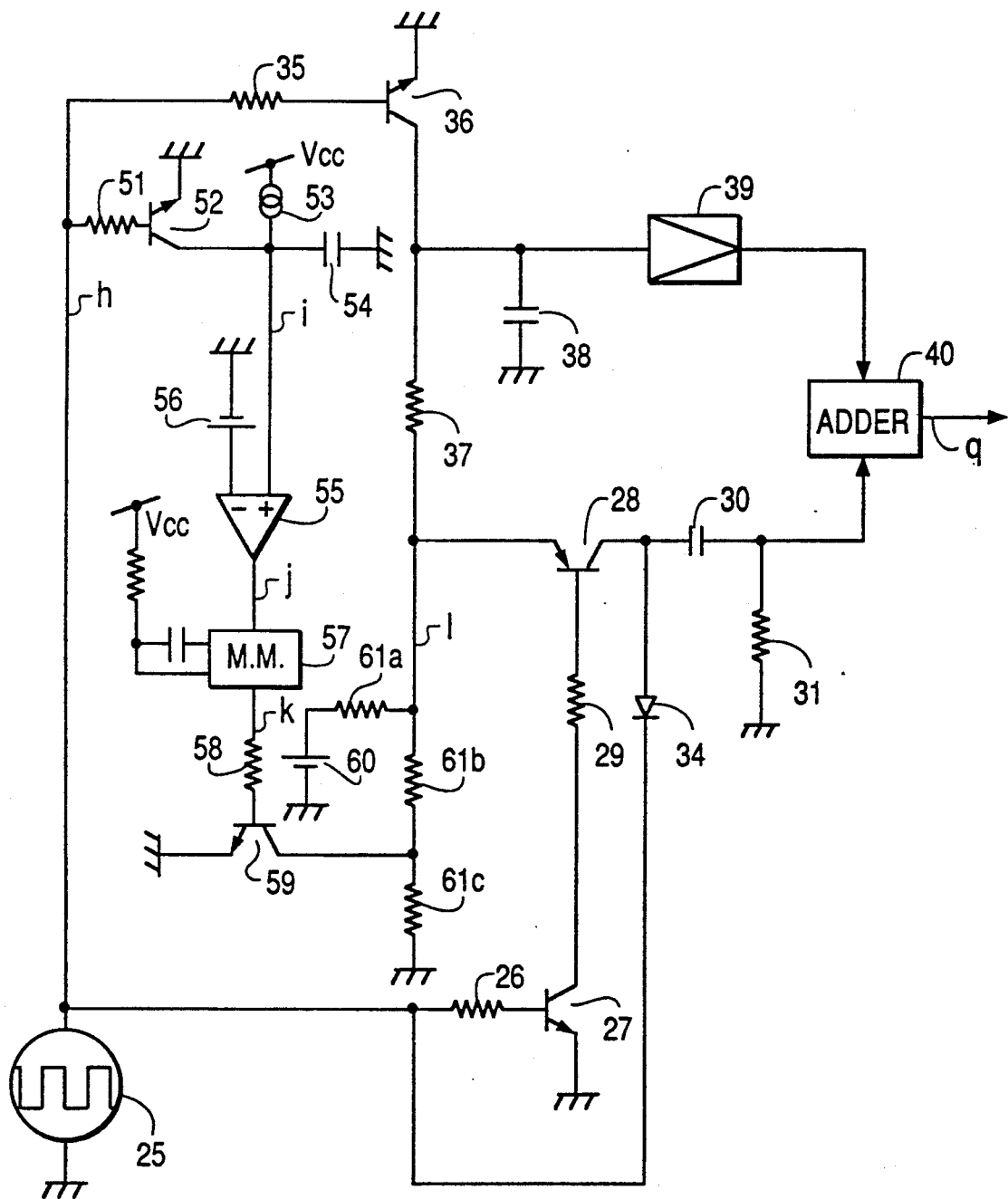
FIG. 11 is a circuit diagram showing a control circuit of the third embodiment of the present invention.

A third embodiment of the present invention will be described below. In this embodiment, a rotating head is moved in a direction perpendicular to the tape running direction according to the rotation speed of the cylinder to keep optimum contact with a tape. FIG. 10 shows a cross-section of a major part of the third embodiment of the present invention, and the construction is almost the same as the first embodiment but a control circuit 50 is different. As is seen from the experimental data in FIG. 28A to FIG. 31C, the higher the rotational speed of the cylinder, the larger the amount of lifting of the tape, and thus the amount of movement of the head should be larger as the amount of curling becomes larger at the tape end. In the first embodiment, the control voltage is supplied in accordance with the kind of the tape, but in the third embodiment the control voltage in accordance with the rotation speed of the cylinder is supplied to the piezoelectric ceramic. FIG. 11 shows a circuit diagram showing the details of the control circuit 50. In FIG. 11 the peak value of the differential waveform is varied in accordance with the rotational speed of the cylinder. Explanation follows with reference to FIG. 11, FIG.

Figure 12:
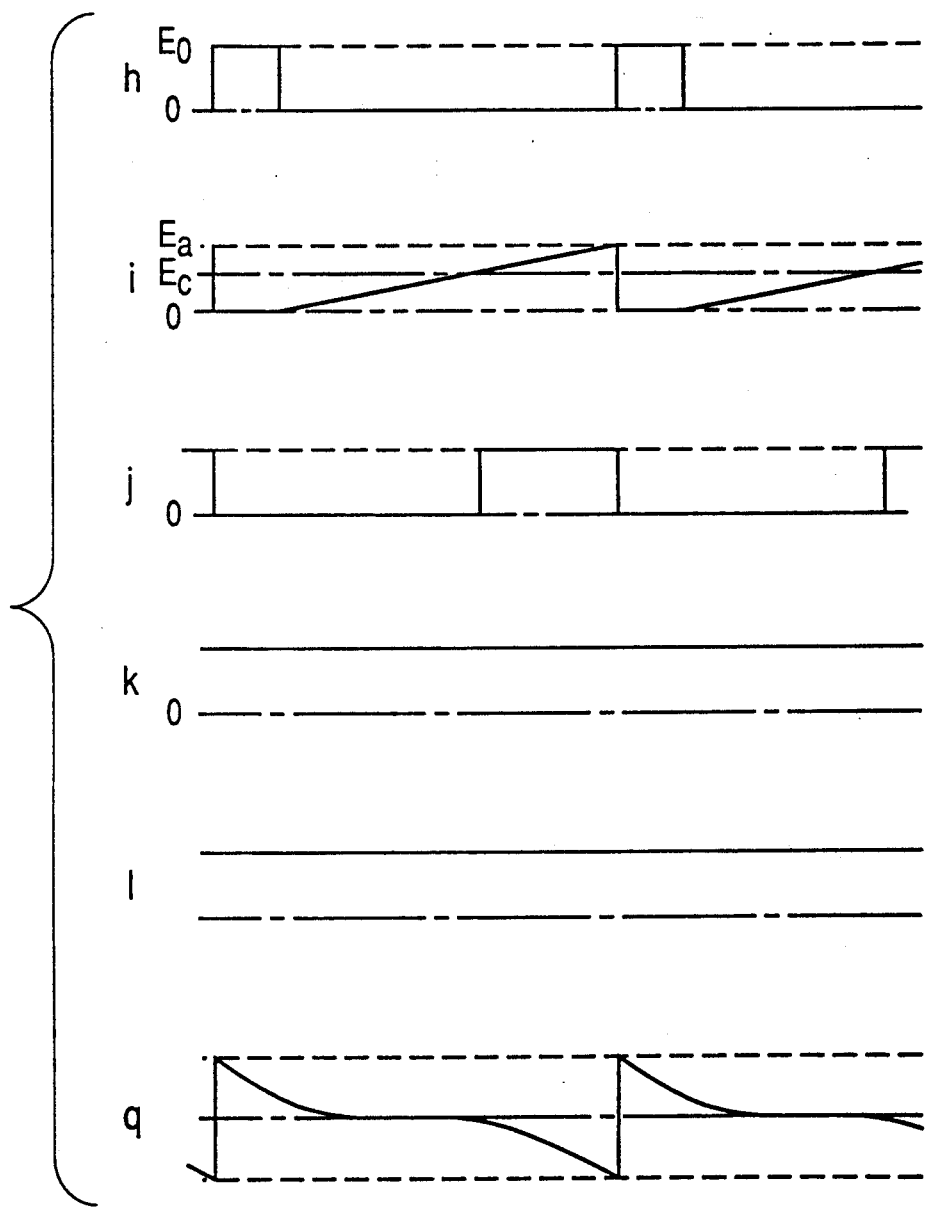
FIG. 12 and FIG. 13 are signal waveform diagrams showing an operation of a driving circuit of the third embodiment of the present invention.
Figure 13:
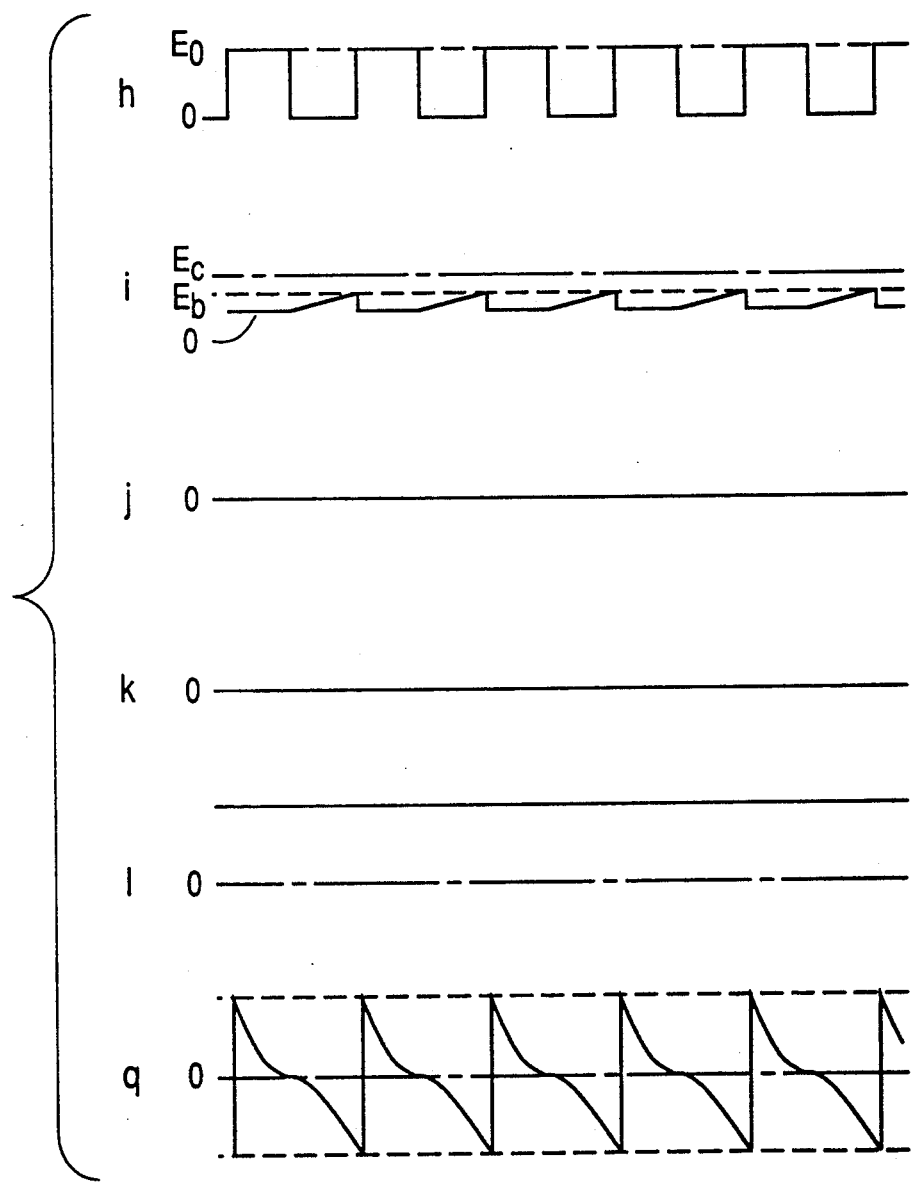

12h–12q, and FIGS. 13h–13q and FIG. 12h–12q show the case in which the rotational speed of the cylinder is at 1800 rpm, and FIGS. 13h–13q show the case in which the rotational speed is at 5400 rpm. When a pulse generated by the pulse generator 25 in the same manner as in the first embodiment closes a transistor 52 via a resistor 51 when it at a high voltage, a constant current 53 is discharged by the transistor 52. Therefore, no current will flow to point i in FIG. 11. Then, as the transistor 52 will open when the generated pulse reaches to a lower voltage level, the voltage waveform as shown in FIG. 12-i or FIG. 13-i will be generated because a part of constant current 53 flows to a capacitor 54 at point i in FIG. 11. Supposing that a peak value of FIG. 12-i be Ea and a peak value in FIG. 13-i is Eb, a relationship of Ea>Eb arises from the figure. Therefore, supposing the value of a power source 56 is Ec (Ea>Ec>Fb), a voltage waveform as shown in FIG. 12-J or FIG. 13-j will arise at point j in FIG. 11 by a comparator 55. By applying this voltage waveform to a monostable multivibrator 57 whose time constant T is 1/60 sec. or more, a voltage waveform as shown in FIG. 12-k or FIG. 13-k is generated at point k in FIG. 11. That is, the rotational speed of 1,800 rpm will correspond to a high voltage while the rotational speed of 5,400 rpm will correspond to a low voltage. Therefore, supposing that the value of a power source 60 is Ed, a resistor 61a is Ra, a resistor 61b is Rb, the value of a resistor 61c is Rc, when a transistor 59 will be closed through a resistor 58 when point k in FIG. 11 is at a high voltage, the current from the power source 60 will flow to the transistor 59, and the voltage at point 1 in FIG. 11 becomes Ed·Rb / (Ra+Rb).

Also, when the transistor 59 opens when point k in FIG. 11 is at a low voltage, the voltage at point 1 in FIG. 11 becomes Ed·(Rb+Rc) / (Ra+Rb+Rc). Supposing here that Ra=Rb=Rc, the voltage at point 1 is Ed/2 at the rotational speed of 1,800 rpm, and is 2Ed/3 at the rotational speed of 5,400 rpm. This value corresponds to the peak value in the embodiment, and the remaining circuit configuration is the same as in the case of FIG. 3. Therefore, the voltage waveform at point q in FIG. 11 becomes as shown in FIG. 12-q or FIG. 13-q.

By applying the voltage wave q as outputted from the control circuit 50 to the piezoelectric ceramic 16, the head 14 is moved. As mentioned before, the higher rotational speed of the cylinder causes the greater lifting of the tape, and thus the resultant tape curling becomes larger. But, as seen from FIG. 12-q and FIG. 13-q, the optimum contact between the head and the tape can be kept regardless of the cylinder rotation speed because the amount of movement of the head becomes larger at the higher cylinder rotation speed.

Although in this embodiment a case is shown that two kinds of cylinder speeds 1,800 rpm and 5,400 rpm are used with one cylinder, it is not limited within the scope of this embodiment along, i.e. such rotational speeds as 1,800 rpm and 3,600 rpm will be also applicable. Also, the method of deviating the head is not limited to the present embodiment alone.

Figure 14:
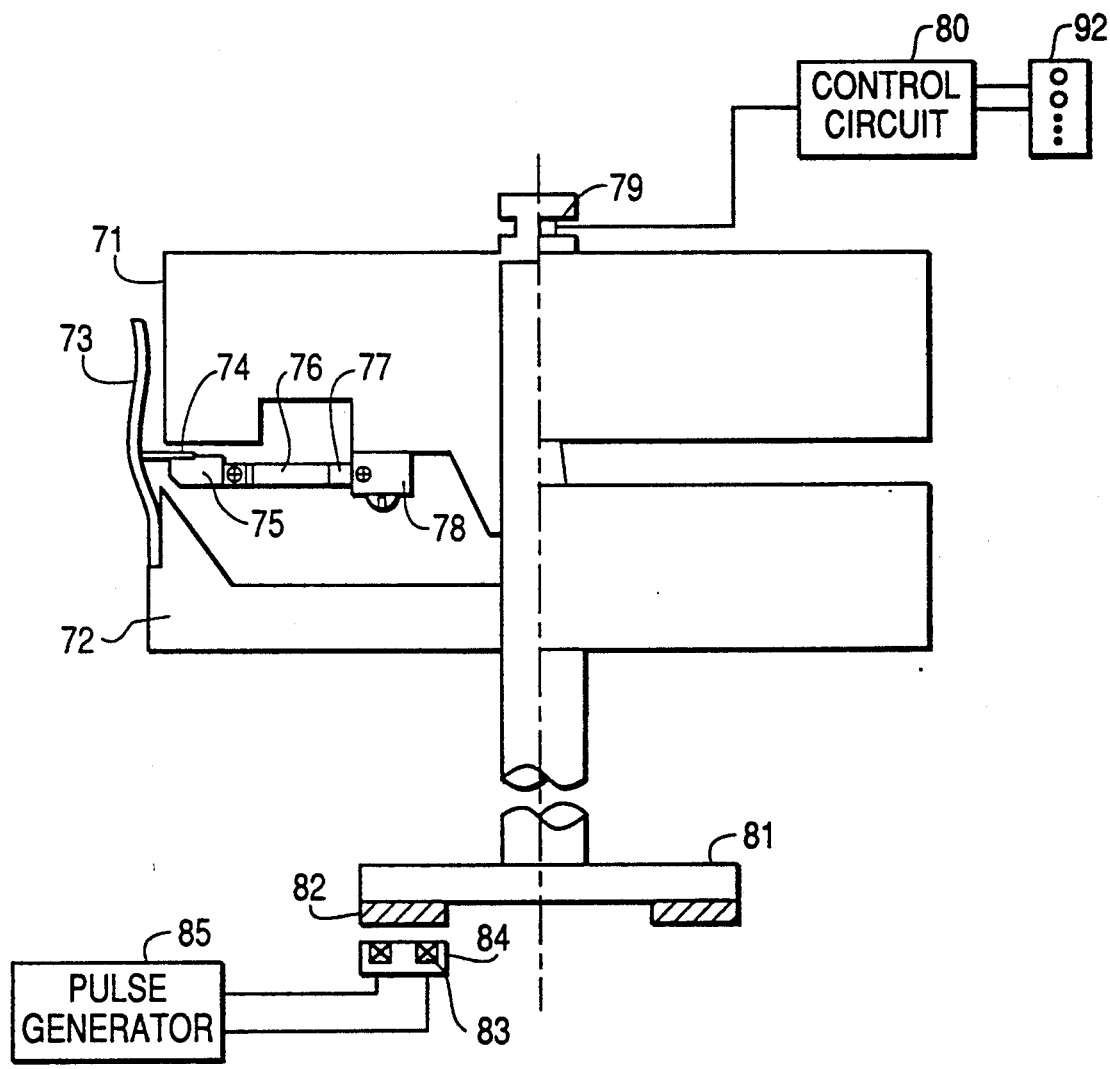
FIG. 14 is a cross-sectional view showing a major part of a rotating head apparatus of a fourth embodiment of the present invention.
Figure 15:
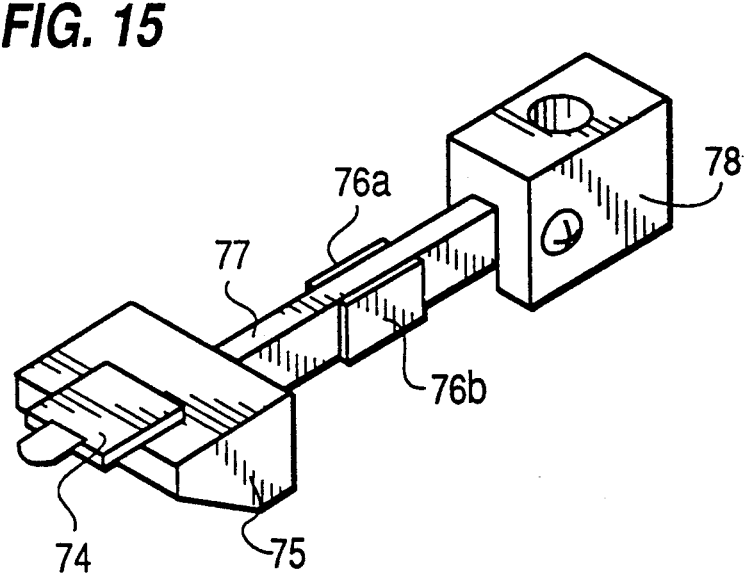
FIG. 15 is a perspective view showing a structure of a major part of the rotating head apparatus of the fourth embodiment of the present invention.
Figure 16A:
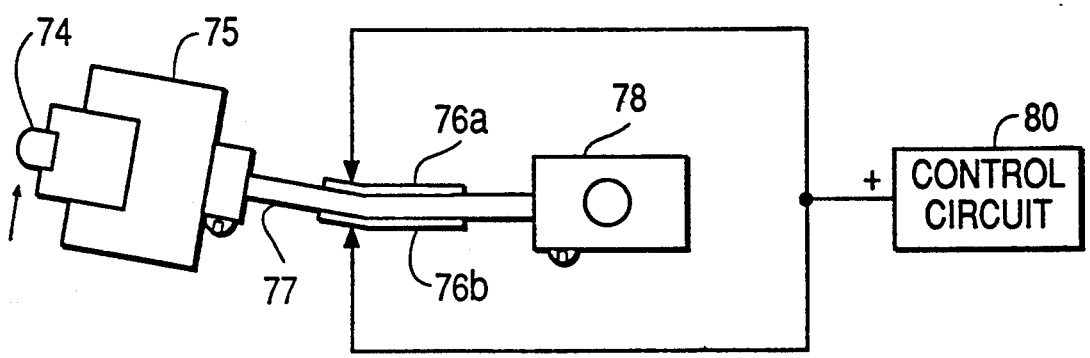
FIGS. 16A–16C are diagrams showing an operation of the rotating head of the fourth embodiment of the present invention.
Figure 16B:
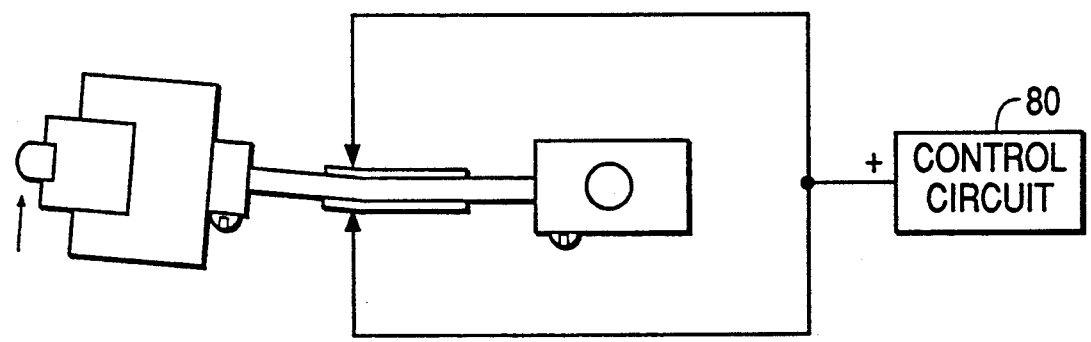
Figure 16C:
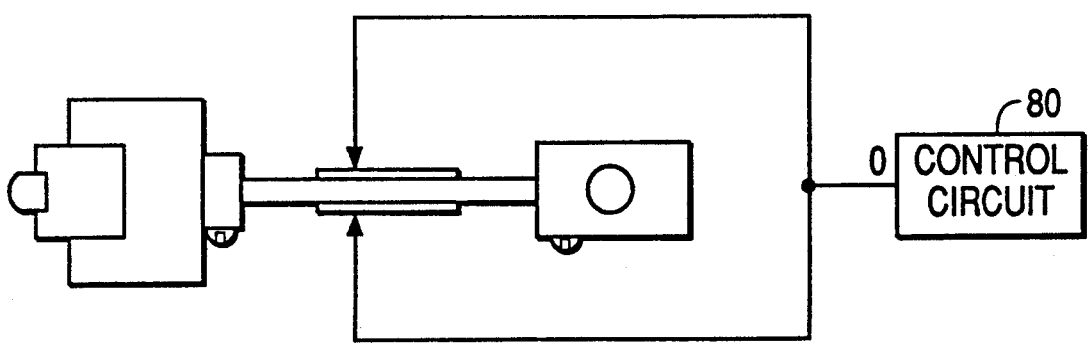

A fourth embodiment of the present invention is shown. In this embodiment, a rotating head is deviated in a direction parallel to the tape running direction according to the kind of the tape to keep in optimum contact with the tape. FIG. 14 is a structural view showing the fourth embodiment of the present invention. A rotating head 74 mounted on a head mounting table 75 made of an insulating material is fixed to a rotary cylinder via electromechanical conversion elements 76, 77 and a frame 78. A slip ring 79, as is already known, is used for transmitting signals from a control circuit 80 to the electromechanical conversion elements 76 and 77. The electromechanical conversion elements 76 and 77 cause a displacement by an electrical signal, and the details of the electromechanical conversion elements 76 and 77 are shown in FIG. 15. In FIG. 15, the thin phosphor bronze plate 77 is supported with a frame 78, and is provided on its opposite major surfaces at the middle thereof with piezoelectric ceramics 76a and 76b. Therefore, as shown in FIGS. 16(A) or 16(B) by applying a voltage, the electromechanical conversion elements 76 and 77 will bend in the direction of the arrow, that is, parallel to the tape running direction. When not applying a voltage, the elements 76 and 77 become parallel with the frame 78 as shown in FIG. 16(C). By shifting the head in this manner, keeping the value of β always 0° will allow stable signal transmission to be made between the rotating head 74 and the tape 73.

However, a variation in the kind of the tape, for example, as shown in FIGS. 33A–33C and FIGS. 34A–34C changes contact state (value of β) between the tape and the head. So by setting a selection means 92 (see FIG. 14) to select the kind of the control circuit 80 generates a proper voltage in accordance with an output of the selection means.

The locus of rotary movement of the rotating head 74 is changed according to the kind of the tape, by first selecting the kind of the tape with the selection means 92, and moving the electromechanical conversion elements 86 and 77, through the slip ring 79 with an output voltage of the control circuit 80 depending on the selected kind of the tape.

In case the rigidity of the tape is small according to experimental results in FIGS. 33A–33C and FIGS. 34A–34C, the amount of head movement may be increased by increasing the value of the control voltage because the value of β is larger than the case that the rigidity of the tape is high.

Figure 17:
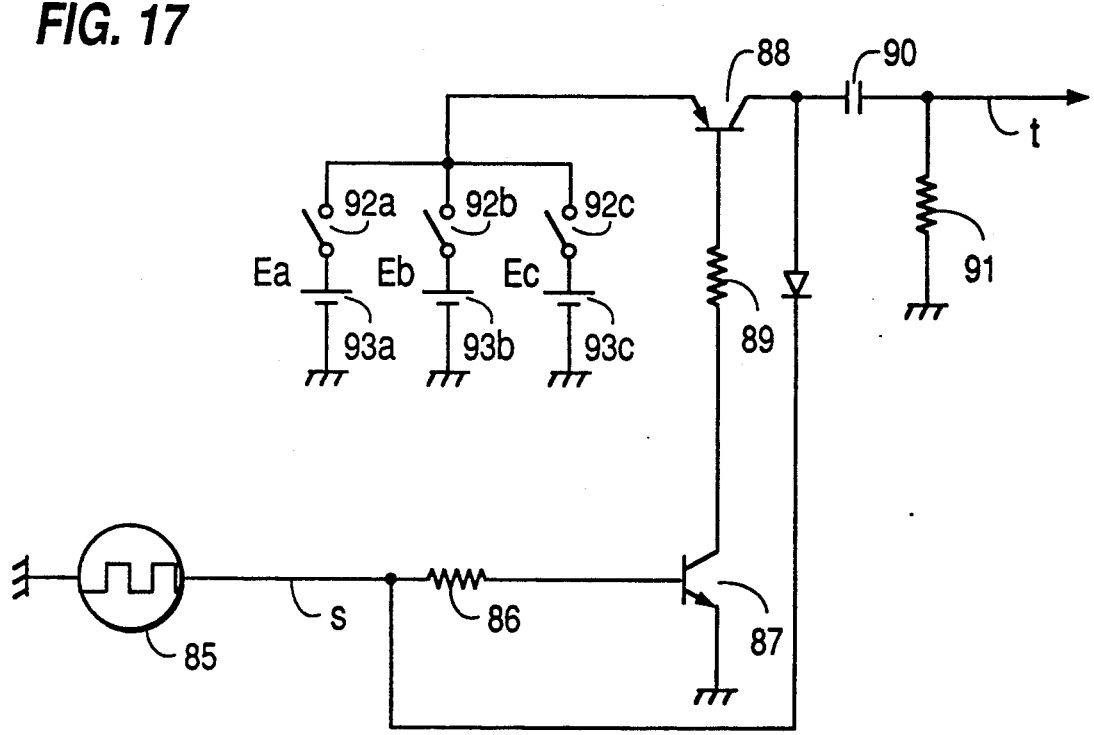
FIG. 17 is a circuit diagram showing a control circuit of the fourth embodiment of the present invention.
Figure 18:
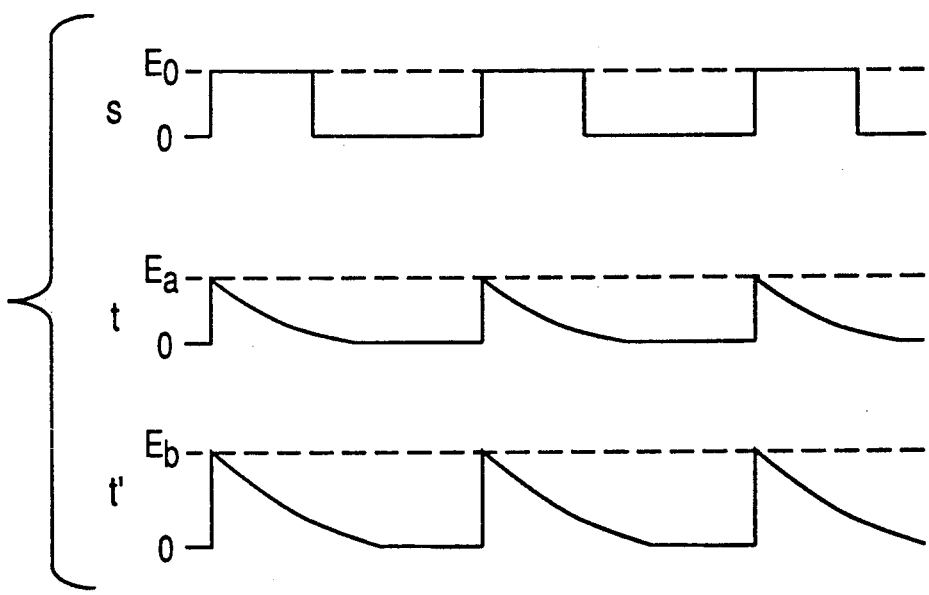
FIGS. 18s–18t' are signal waveform diagrams showing an operation of a driving circuit of the fourth embodiment of the present invention.

Explanation will follow in detail with regard to the control circuit 80 and the selection button 92 is FIG. 14. FIG. 17 shows a circuit configuration of the control circuit 80 and the selection switch 92 (92a–92c) to supply voltage to the piezoelectric ceramic 76. The motion reference signal of the circuit shown in FIG. 17 is generated by detecting the rotary phase of the rotating head 74 by a pulse generator 85 (FIG. 18-s). Explanation for this is omitted as this is carried out in the same method as the first embodiment. As transistors 87 and 88 are closed via a resistor 86 when the reference signal becomes a higher voltage, a differential waveform is generated by a capacitor 90 and a resistor 91 at part t (FIG. 18-t). The peak level of the differential waveform is a value to be determined by power sources 93a–93c. Here, the construction of the selection switch 92 (92a–92c) is arranged in such a manner that in FIG. 17 setting a selection switch 92a ON makes the peak level Ea of the power source 93a, setting a selection switch 92b ON makes the peak level Eb of the power source 93b, and setting a selection switch 92c ON makes the peak level Ec of the power source 93c. In this connection, supposing Ea>Eb, setting the selection switch 92a ON makes the peak level Ea, and the signal to be supplied to the piezoelectric ceramic 76 becomes as shown in FIG. 18-t. The condition of the selection switch 92b being ON makes the peak level Eb, and the signal to be supplied to the piezoelectric ceramic 76 becomes as shown in FIG. 18 *t'*. Therefore, the amount of head movement allows the value of β to be always nearly 0° as it can be changed according to the kind of tape, by turning the switch 92*a* ON when the rigidity of the tape is lower while when the rigidity of the tape is higher by turning the switch 92*b* ON.

According to the present embodiment as above, improvement on the contact state between the tape and the rotating head to be made in accordance with the kind of the tape in a simple construction provides a rotating head apparatus which protects deterioration of performance of signal recording or reproduction.

In the present embodiment a selection means was made of a selecting switch, however, it is not only limited to such embodiment alone, but such a configuration also provides the same effect by turning switches ON and OFF with use of a cassette detection hole (see FIG. 8).

In this embodiment the kind of the tape is depended on rigidity alone, but it is not limited to it, moreover, controlling the quantity of the head deviation by depending on such other factors as tape thickness may be applicable.

Figure 19:
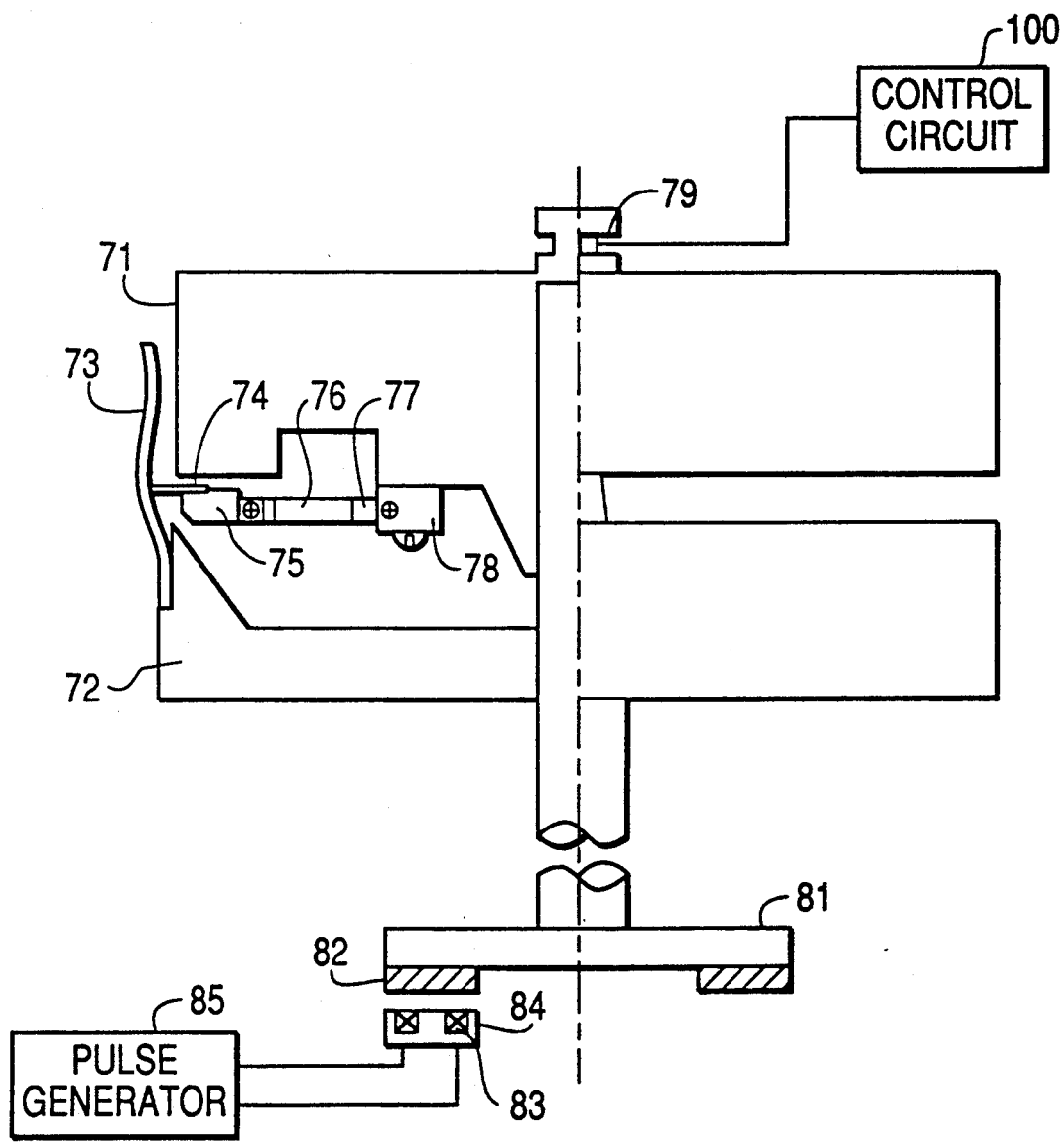
FIG. 19 is a sectional view showing a structure of a major part of a rotating head apparatus of a fifth embodiment of the present invention.
Figure 35:
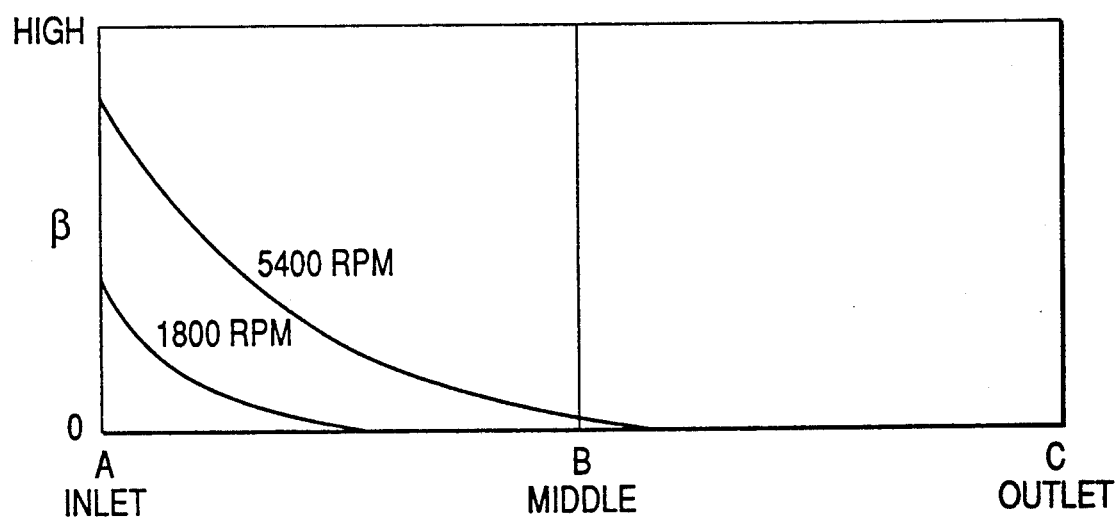
FIG. 35 shows measurement data.

An explanation follows below for a fifth embodiment of the present invention. In this embodiment, a rotating head is moved in a direction parallel with the tape running direction according to the cylinder rotating speed to keep optimum contact with the tape. FIG. 19 shows a cross-section showing a major part of the fifth embodiment of the present invention, in which the configuration is almost the same as that of the fourth embodiment, but differ in a control circuit 100. In FIG. 35, as is known in the experimental data, it is necessary to make the amount of head movement larger at the higher rotational speed of the cylinder at which the amount of the tape lift becomes bigger.

In the fourth embodiment, a control voltage in accordance with the kind of the tape is supplied to the piezoelectric ceramic 76, but in the fifth embodiment a control voltage in accordance with the cylinder rotational speed is supplied to the piezoelectric ceramic 76.

Figure 20:
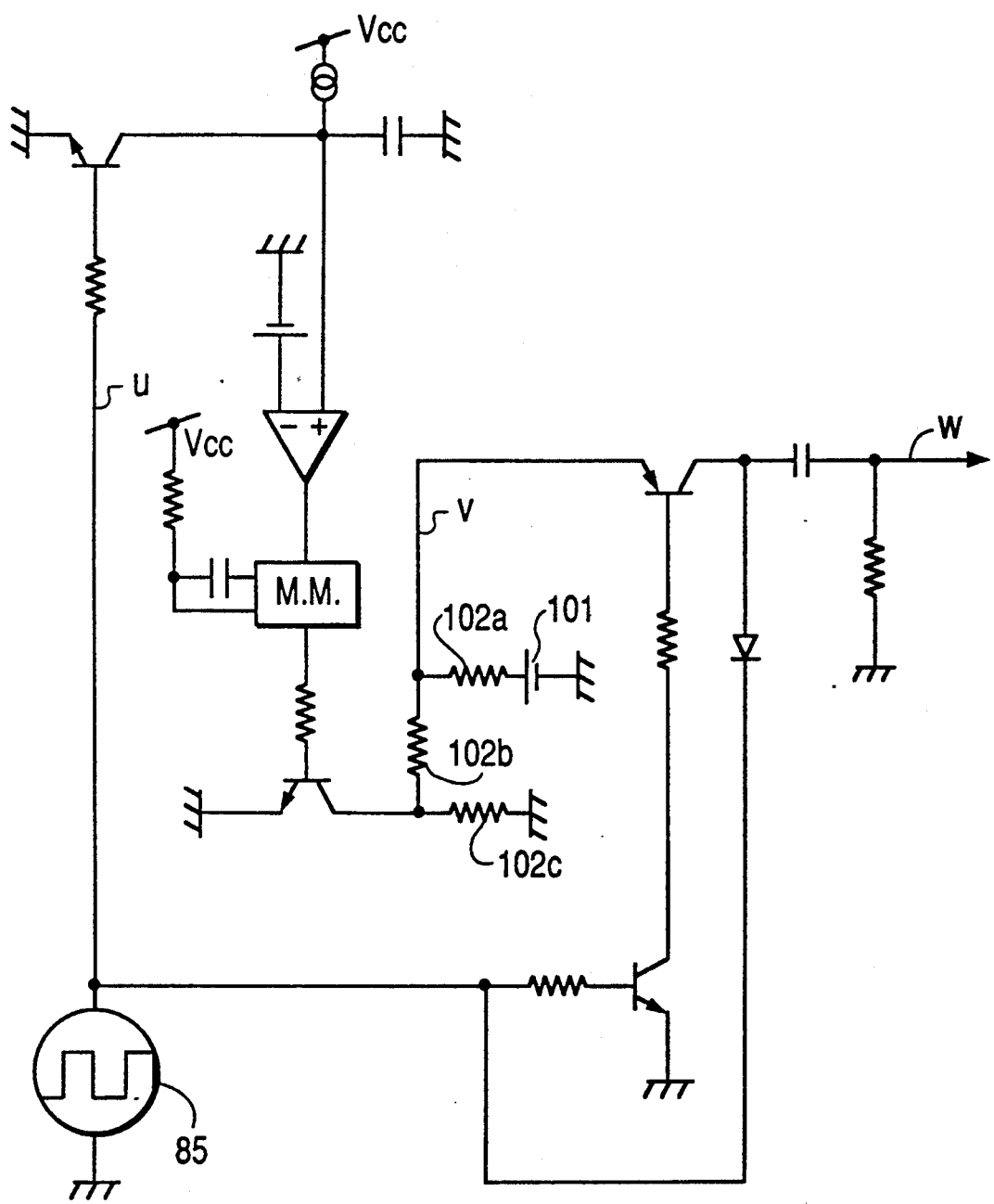
FIG. 20 is a circuit diagram showing a control circuit of the fifth embodiment of the present invention.

FIG. 20 shows a circuit diagram showing the details of the control circuit 100, and differs from the circuit as shown in FIG. 17 in a part of selecting means (switch 92, power supply 93). In FIG. 20, the peak level of the differential waveshape is varied in accordance with the cylinder rotational speed. The explanation will follow hereinafter by using FIGS. 21*u*–21*w* and FIGS. 22*u*–22*w* . FIGS. 21*u*–21*w* shows the case of the cylinder rotational speed of 1,800 rpm while FIGS. 22*u*–22 *w* is for speed of 5,400 rpm.

Figure 21:
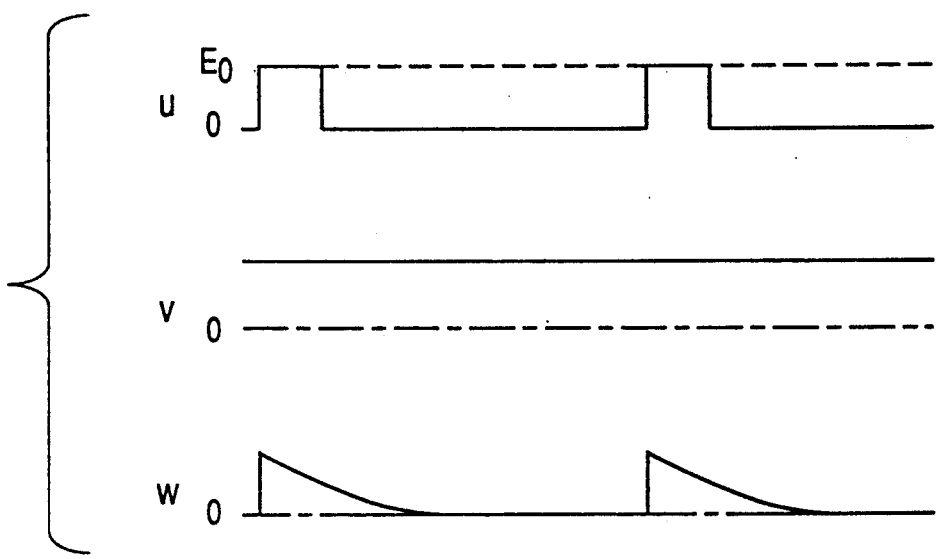
FIGS. 21u–21w and FIGS. 22u–22w are signal waveform diagrams showing an operation of a driving circuit of the fifth embodiment of the present invention.
Figure 22:
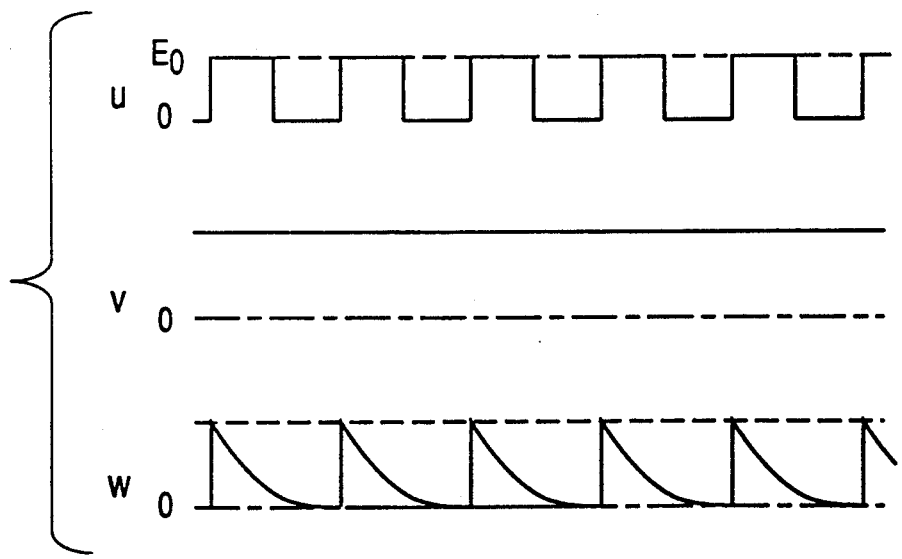
Figure 23:
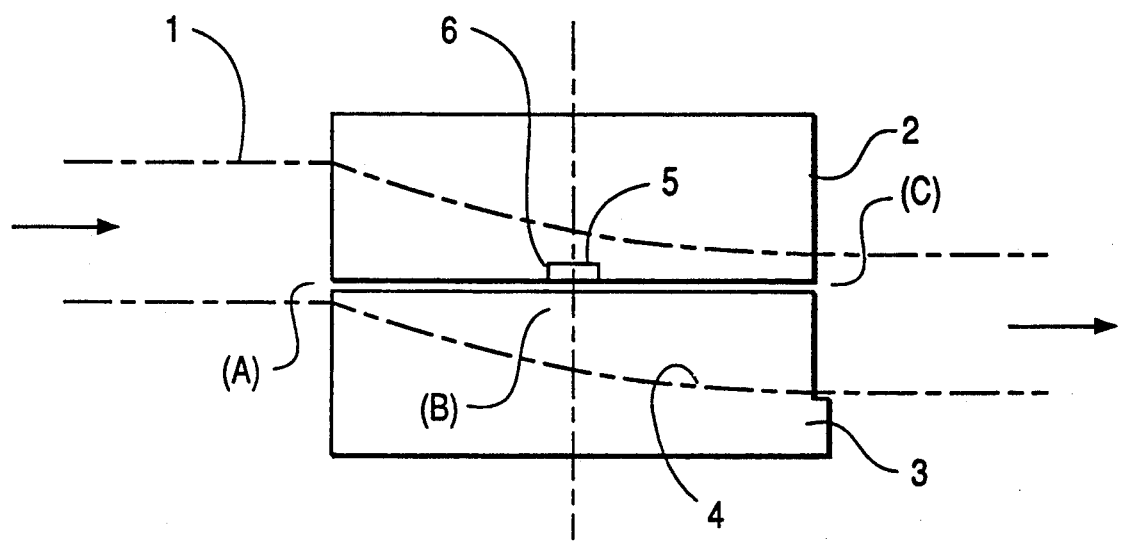
FIG. 23 is a side view of a conventional rotating head apparatus.
Figure 24:
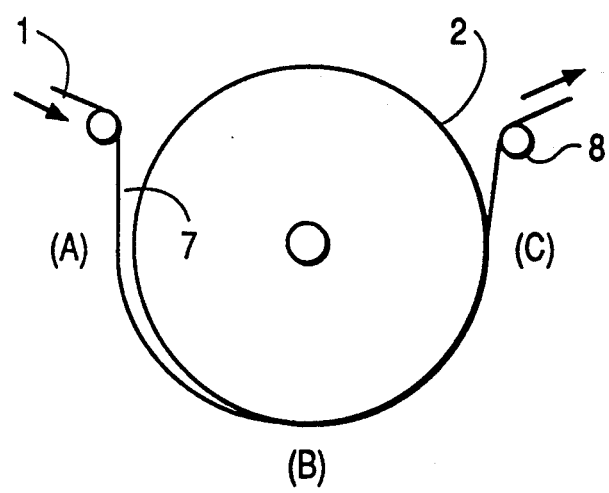
FIG. 24 is a top view of the conventional rotating head apparatus.

A pulse generator 85 generates a reference pulse signal in the same method as the first embodiment (see point u in FIG. 21*u* and FIG. 22*u*). Supposing the value of a power source 101 be Ef, the value of a resistor 102*a* be Ra, the value of a resistor 102*b* be Rb, and the value of a resistor 102*c* be Rc, the voltage at FIG. 21*v* becomes Ef·Rb / (Ra+Rb), and voltage at FIG. 22*v* becomes Ef·(Rb+Rc) / (Ra+Rb+Rc) as in the same manner as that explained in FIG. 11 of the third embodiment. Here, for example, supposing Ra=Rb=Rc, the voltage at point l is Ef/2 at the cylinder rotational speed of 1,800 rpm and 2Ef/3 at a speed of 5,400 rpm. This value corresponds to the peak level in the fourth embodiment, and the remaining circuit configuration is the same as that in FIG. 17. Therefore, the voltage waveform of part w in FIG. 20 becomes as shown in FIG. 21-*w* or FIG. 22-*w*.

The head 74 is moved by supplying the voltage waveform w outputted from the control circuit 100 to the piezoelectric ceramic 76 as shown in FIG. 16. As mentioned earlier, the higher cylinder rotational speed causes the larger amount of tape lift. But as is seen from FIG. 21-*w* and FIG. 22-*w*, the contact state between the head and the tape is kept stable regardless of the cylinder speed because the higher cylinder rotational speed causes the larger amount of head movement.

The selection of the cylinder rotational speed may not be limited to 1,800 rpm and 5,400 rpm, but may be any other speeds, for example 1,800 rpm and 3,600 rpm.

What is claimed is:

1. A rotating head apparatus comprising:

a cylinder which guides a magnetic tape along a helical path over a specific circumferential angle, said magnetic tape being one of a plurality of kinds of magnetic tapes, each kind of magnetic tape having different mechanical characteristics from the other kinds of magnetic tapes, and said cylinder including a rotary cylinder which is rotating at a specific rotational speed;

a rotating head which is mounted on said rotary cylinder so as to rotate at said specific rotational speed and has a magnetic gap for recording signals on and reproducing signals from said magnetic tape;

a moving means for pivotally moving said rotating head relative to said rotary cylinder so as to change an angle formed between a center line of said magnetic gap and a normal line to a contacting surface between said rotating head and said magnetic tape;

a discriminating means for discriminating the kind of said magnetic tape and for outputting a signal indicative of the discriminated kind of said magnetic tape; and a control means for controlling said moving means according to said signal output from said discriminating means to keep said rotating head in such a contact with said magnetic tape that the center line of said magnetic gap coincides with the normal line to the contacting surface between said rotating head and said magnetic tape.

2. An apparatus as claimed in claim 1, wherein said control mean comprises: a rotational position detecting means for detecting a rotational position of said rotating head and for outputting a signal indicative of the detected rotational position; a means for generating a periodic saw-tooth waveform voltage signal from said signal output from said rotational position detecting means, and a means for controlling a peak voltage value of the saw-tooth waveform voltage signal according to said signal output from said discriminating means, said peak voltage value controlled saw-tooth waveform voltage signal being supplied to said moving means.

3. A rotating head apparatus comprising:

a cylinder which guides a magnetic tape along a helical path over a specific circumferential angle, said cylinder including a rotary cylinder which is rotating at a specific rotational speed;

a rotating head which is mounted on said rotary cylinder so as to rotate at said specific rotational speed and has a magnetic gap for recording signals on and reproducing signals from said magnetic tape;

a moving means for pivotally moving said rotating head relative to said rotary cylinder so as to change an angle formed between a center line of said magnetic gap and a normal line to a contacting surface between said rotating head and said magnetic tape;
a detecting means for detecting the rotational speed of said rotating head and for outputting a signal indicative of the detected rotational speed; and
a control means for controlling said moving means according to said signal output from said detecting means to keep said rotating head in such a contact with said magnetic tape that the center line of said magnetic gap coincides with the normal line to the contacting surface between said rotating head and said magnetic tape.

4. An apparatus as claimed in claim 3, wherein said detecting means comprises: a rotational position detecting means for detecting a rotational position of the rotating head and for outputting a signal indicative of the detected rotational position; a means for generating a periodic saw-tooth waveform voltage signal supplied to said moving means from said signal output from said rotational phase detecting means, and a means for controlling a peak voltage value of said saw-tooth waveform voltage signal according to the signal output from said rotational speed detecting means.

* * * * *